(12) United States Patent
DiVerdi et al.

(10) Patent No.: US 11,216,170 B2
(45) Date of Patent: Jan. 4, 2022

(54) FACILITATING EDITING OF SPHERICAL PANORAMA VIDEOS USING A VIRTUAL-REALITY HEADSET

(71) Applicant: Adobe Inc., San Jose, CA (US)

(72) Inventors: Stephen DiVerdi, Oakland, CA (US); Aaron Hertzmann, San Francisco, CA (US); Cuong Nguyen, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/944,902

(22) Filed: Jul. 31, 2020

(65) Prior Publication Data

US 2020/0363940 A1 Nov. 19, 2020

Related U.S. Application Data

(63) Continuation of application No. 15/337,457, filed on Oct. 28, 2016, now Pat. No. 10,754,529.

(51) Int. Cl.
*G06F 3/048* (2013.01)
*G06F 3/0484* (2013.01)
(Continued)

(52) U.S. Cl.
CPC .......... *G06F 3/04847* (2013.01); *G06F 3/011* (2013.01); *G06F 3/012* (2013.01); *G06F 3/0485* (2013.01); *G06F 3/04815* (2013.01); *G06F 3/04845* (2013.01); *G06T 11/60* (2013.01); *G11B 27/031* (2013.01); *G11B 27/036* (2013.01); *G11B 27/34* (2013.01);
(Continued)

(58) Field of Classification Search
CPC .. G06F 3/04847; G06F 3/04815; G06F 3/011; G06F 3/012; G06F 3/0485; G06F 3/04845; G06T 11/60; G06T 2200/24; G11B 27/031; G11B 27/34; G11B 27/036; H04N 5/262; H04N 5/23238; G02B 27/017
See application file for complete search history.

(56) References Cited

U.S. PATENT DOCUMENTS 9,277,122 B1 3/2016 Imura et al.
2013/0055087 A1 2/2013 Flint
(Continued)

OTHER PUBLICATIONS

360VR Toolbox, as disclosed in a video published through YouTube on Sep. 12, 2015, available at https://www.youtube.com/watch?v=IcHy8xEt2QI (screenshots attached) (Year: 2015).*
(Continued)

*Primary Examiner* — Keith D Bloomquist
(74) *Attorney, Agent, or Firm* — Keller Jolley Preece

(57) ABSTRACT

The present disclosure is directed toward systems and methods that enable simultaneous viewing and editing of audio-visual content within a virtual-reality environment (i.e., while wearing a virtual-reality device). For example, the virtual-reality editing system allows for editing of audio-visual content while viewing the audio-visual content via a virtual-reality device. In particular, the virtual-reality editing system provides an editing interface over a display of audio-visual content provided via a virtual-reality device (e.g., a virtual-reality headset) that allows for editing of the audio-visual content.

20 Claims, 16 Drawing Sheets

(51) Int. Cl.

| | |
|---|---|
| *G06T 11/60* | (2006.01) |
| *G11B 27/031* | (2006.01) |
| *G11B 27/34* | (2006.01) |
| *G06F 3/01* | (2006.01) |
| *G06F 3/0485* | (2013.01) |
| *G11B 27/036* | (2006.01) |
| *G06F 3/0481* | (2013.01) |
| *H04N 5/232* | (2006.01) |
| *H04N 5/262* | (2006.01) |

(52) U.S. Cl.
CPC ...... *G06T 2200/24* (2013.01); *H04N 5/23238* (2013.01); *H04N 5/262* (2013.01)

(56) References Cited

U.S. PATENT DOCUMENTS

| | | | |
|---|---|---|---|
| 2016/0300392 A1 | 10/2016 | Jonczyk et al. | |
| 2017/0180780 A1 | 6/2017 | Jeffries | |
| 2017/0295361 A1* | 10/2017 | Dashwood | G06F 3/04815 |
| 2018/0024630 A1 | 1/2018 | Goossens | |
| 2018/0121069 A1 | 5/2018 | DiVerdi et al. | |

OTHER PUBLICATIONS

Natalia Bogdan, Tovi Grossman, and George Fitzmaurice. 2014. Hybridspace: Integrating 3D freehand input and stereo viewing into traditional desktop applications. In 2014 IEEE Symposium on 3D User Interfaces (3DUI). IEEE, 51-58.
Wutthigrai Boonsuk, Stephen Gilbert, and Jonathan Kelly. 2012. The impact of three interfaces for 360-degree video on spatial cognition. In Proceedings of the 2012 ACM annual conference on Human Factors in Computing Systems—CHI '12. ACM Press, New York, New York, USA, 2579.
Jessica Brillhart. 2016a. In the Blink of a Mind—Attention. (2016).
Jessica Brillhart. 2016b. In the Blink of a Mind—Prologue. (2016).
Kai-Yin Cheng, Sheng-Jie Luo, Bing-Yu Chen, and Hao-Hua Chu. 2009. SmartPlayer: User-Centric Video Fast-Forwarding. In Proceedings of the 27th international conference on Human factors in computing systems—CHI 09. ACM Press, New York, New York, USA, 789.
Andy Cockburn, Amy Karlson, and Benjamin B Bederson. 2008. A review of overview+detail, zooming, and focus+context interfaces. Comput. Surveys 41, 1 (Dec. 2008), 1-31.
Ajoy S Fernandes and Steven K Feiner. 2016. Combating VR sickness through subtle dynamic field-of-view modification. In 2016 IEEE Symposium on 3D User Interfaces (3DUI). IEEE, 201-210.
Dustin E.R. Freeman, Stephanie Santosa, Fanny Chevalier, Ravin Balakrishnan, and Karan Singh. 2014. LACES: Live Authoring through Compositing and Editing of Streaming Video Dustin. In Proceedings of the 32nd annual ACM conference on Human factors in computing systems—CHI '14. ACM Press, New York, New York, USA, 1207-1216.
Edwin L. Hutchins, James D. Hollan, and Donald A. Norman. 1985. Direct Manipulation Interfaces. Human-Computer Interaction 1, 4 (Dec. 1985), 311-338.
Shunichi Kasahara and Jun Rekimoto. 2015. Jackin Head: Immersive Visual Telepresence System with Omnidirectional Wearable Camera for Remote Collaboration. In Proceedings of the 21st ACM Symposium on Virtual Reality Software and Technology—VRST '15. ACM Press, New York, New York, USA, 217-225.
Robert S Kennedy, Norman E Lane, Kevin S Berbaum, and Michael G Lilienthal. 1993. Simulator sickness questionnaire: An enhanced method for quantifying simulator sickness. The international journal of aviation psychology 3, 3 (1993), 203-220.
Don Kimber, Jonathan Foote, and Surapong Lertsithichai. 2001. FlyAbout: Spatially Indexed Panoramic Video. In Proceedings of the ninth ACM international conference on Multimedia—Multimedia '01. ACM Press, New York, New York, USA, 339.
Eugenia M Kolasinski. 1995. Simulator Sickness in Virtual Environments. Technical Report. DTIC Document.
Johannes Kopf. 2016. 360 video stabilization: A new algorithm for smoother 360 video viewing. (2016).
Oh-Hyun Kwon, Chris Muelder, Kyungwon Lee, and Kwan-Liu Ma. 2016. A Study of Layout, Rendering, and Interaction Methods for Immersive Graph Visualization. IEEE Transactions on Visualization and Computer Graphics 22, 7 (2016), 1802-1815.
Bruce D Lucas and Takeo Kanade. 1981. An iterative image registration technique with an application to stereo vision.. In International Joint Conference on Artificial Intelligence. 674-679.
Alessandro Mulloni, Hartmut Seichter, Andreas Dünser, Patrick Baudisch, and Dieter Schmalstieg. 2012. 360° panoramic overviews for location-based services. In Proceedings of the 2012 ACM annual conference on Human Factors in Computing Systems—CHI '12. ACM Press, New York, New York, USA, 2565.
Luís a. R. Neng and Teresa Chambel. 2010. Get around 360° hypervideo. In Proceedings of the 14th International Academic MindTrek Conference on Envisioning Future Media Environments—MindTrek'10. ACM Press, New York, New York, USA, 119.
Benjamin Petry and Jochen Huber. 2015. Towards effective interaction with omnidirectional videos using immersive virtual reality headsets. In Proceedings of the 6th Augmented Human International Conference on—AH '15. ACM Press, New York, New York, USA, 217-218.
Suporn Pongnumkul, Jue Wang, and Michael Cohen. 2008. Creating map-based storyboards for browsing tour videos. In Proceedings of the 21st annual ACM symposium on User interface software and technology—UIST '08. 13.
Gustavo Alberto Rovelo Ruiz, Davy Vanacken, Kris Luyten, Francisco Abad, and Emilio Camahort. 2014. Multi-viewer gesture-based interaction for omni-directional video. In Proceedings of the 32nd annual ACM conference on Human factors in computing systems—CHI '14. ACM Press, New York, New York, USA, 4077-4086.
Klaus Schoeffmann, Marco A Hudelist, and Jochen Huber. Video Interaction Tools: A Survey of Recent Work. Comput. Surveys 48, 1 (Sep. 2015), 1-34.
Haijun Xia, Bruno Araujo, Tovi Grossman, and Daniel Wigdor. Object-Oriented Drawing. In Proceedings of the 2016 CHI Conference on Human Factors in Computing Systems—CHI '16. ACM Press, New York, New York, USA, 4610-4621.
Unreal Editor 4, as disclosed in a video published at YouTube on Feb. 4, 2016, available for full review at https://www.youtube.com/watch?v=JKO9fEjNiio (Year: 2016).
U.S. Appl. No. 15/337,457, Sep. 6, 2018, Office Action.
U.S. Appl. No. 15/337,457, Feb. 26, 2019, Office Action.
U.S. Appl. No. 15/337,457, Jul. 25, 2019, Office Action.
U.S. Appl. No. 15/337,457, Dec. 31, 2019, Office Action.
U.S. Appl. No. 15/337,457, Apr. 13, 2020, Notice of Allowance.

\* cited by examiner

US 11,216,170 B2

FACILITATING EDITING OF SPHERICAL PANORAMA VIDEOS USING A VIRTUAL-REALITY HEADSET

CROSS-REFERENCE TO RELATED APPLICATIONS

The present application is a continuation of U.S. application Ser. No. 15/337,457, filed on Oct. 28, 2016. The aforementioned application is hereby incorporated by reference in its entirety.

BACKGROUND

Recent years have seen rapid development in the area of digital camera devices, particularly digital cameras capable of capturing spherical or 360-degree audio-visual media. Indeed, consumers now have access to a variety of cameras and 360-degree audio-visual content viewing devices that enables users to capture and view 360-degree audio-visual content. For example, with virtual-reality devices (e.g., virtual-reality headsets), users can immerse themselves in a virtual-reality environment that provides an enhanced viewing experience.

Although virtual-reality devices provide an immersive environment for viewing 360-degree audio-visual content, 360-degree audio-visual content introduces a variety of problems when producing and editing the audio-visual content. For example, conventional editing systems generally provide a distorted (e.g., warped) display of the 360-degree audio-visual content converted via a two-dimensional (2D) display. As a result, users can find it difficult to effectively edit 360-degree audio-visual content using conventional editing systems.

Some conventional editing systems enable users to preview virtual-reality content by wearing a virtual-reality device. For instance, such conventional editing systems enable users to edit 360-degree audio-visual content by interacting with the 2D display. Upon editing the 360-degree audio-visual content, users can preview or otherwise view the edits via the virtual-reality device. However, switching back and forth between the 2D display and virtual-reality display is often time consuming and frustrating. In addition, due to the dramatic difference between a virtual-reality display and a converted 2D display, editing 360-degree audio-visual content often requires numerous iterations to arrive at a finished product. As a result, editing 360-degree audio-visual content can be frustrating even for experienced editors.

SUMMARY

Embodiments of the present disclosure provide benefits and/or solve one or more of the foregoing and other problems in the art with systems and methods for facilitating editing of virtual-reality content while viewing the content via a virtual-reality device. In particular, the disclosed systems and methods provide an editing interface and editing tools that facilitate editing of virtual-reality content over a view of the content provided via the virtual-reality device. The editing interface includes controls that facilitate modifying the display of the virtual-reality content. Upon receiving a confirmation of one or more edits to perform to the virtual-reality content, the systems and methods generate revised virtual-reality content. Thus, in one or more embodiments, the systems and methods described herein enable a user to simultaneously view and edit virtual-reality content while wearing a virtual-reality device.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1:
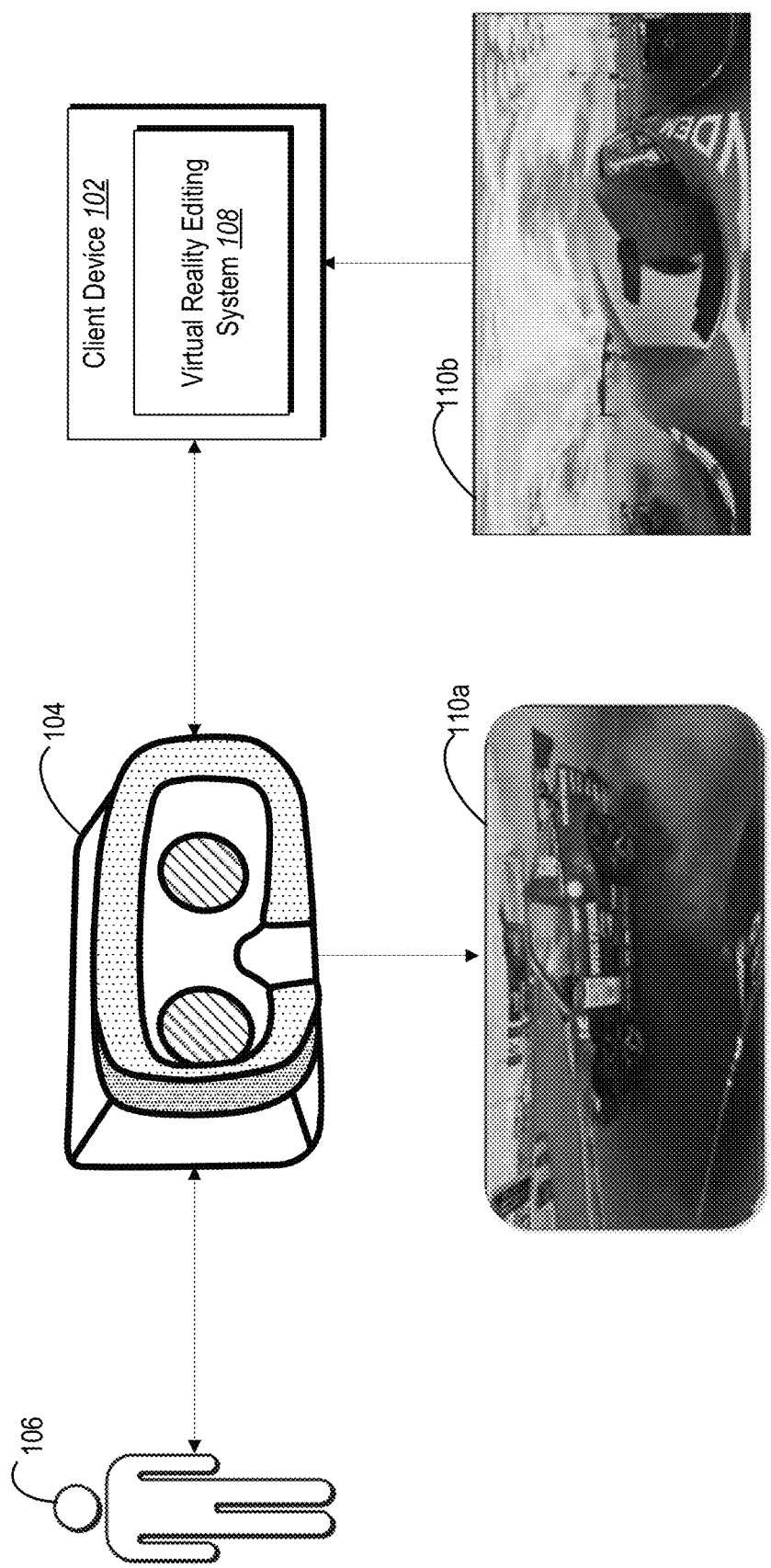
FIG. 1 illustrates a block diagram of an exemplary environment in which a virtual-reality editing system can be implemented in accordance with one or more embodiments.

One or more embodiments of the present disclosure include a virtual-reality editing system that enables simultaneous viewing and editing of virtual-reality content within a virtual-reality environment (i.e., while wearing a virtual-reality device). For example, the virtual-reality editing system allows a user to edit audio-visual content while viewing the audio-visual content via a virtual-reality device. In particular, the virtual-reality editing system provides an editing interface over a display of audio-visual content provided via a virtual-reality device (e.g., a virtual-reality headset).

The virtual-reality editing system provides an editing interface includes controls for implementing and previewing edits. In one or more embodiments, the editing interface includes one or more controls that enable inserting, cutting, and/or aligning of different sections of virtual-reality content. In particular, as will be described in further detail below, the editing interface include controls for selectively adding or removing clips of a virtual-reality video. In addition, the virtual-reality editing system allows for a section of the video to rotate (e.g., horizontally rotate) relative to another section of the video. In this way, the virtual-reality editing system enables alignment of sequential segments of virtual-reality content to ensure interesting or exciting portions of the virtual-reality content occur within the field of view of the viewer rather than to the side or behind the viewer within the virtual-reality display.

As another example, in one or more embodiments, the virtual-reality editing system provides one or more controls that reduce potential motion sickness for a user (e.g., an editor or viewer) of a virtual-reality device. For instance, the virtual-reality editing system control the field of view of shaky scenes when scrolling (e.g., scrubbing) through virtual-reality content. For example, the virtual-reality editing system can cause a field of view to contract (e.g., narrow) in response to detecting that the user is scrolling through the virtual-reality content. In this way, the virtual-reality editing system enables a user to quickly scroll through and interact with the display of the virtual-reality video without inadvertently causing motion sickness due to sudden movements or moving objects on the display.

As another example, in one or more embodiments, the virtual-reality editing system allows for the addition of comments or graphics to virtual-reality content while viewing the display of the virtual-reality video. In particular, the virtual-reality editing system provides controls that enable an editor wearing the virtual-reality device to place and move a graphic within the display of the virtual-reality content while wearing the virtual-reality device. In this way, the editor can immediately see how the graphic appears within the display of the virtual-reality content.

As yet another example, in one or more embodiments, the virtual-reality editing system allows for the addition of bookmarks to virtual-reality content. In particular, in one or more embodiments, the virtual-reality editing system enables selection of a position within the virtual-reality content (e.g., a time and a rotational position) as a bookmark. The virtual-reality editing system, upon selection of a bookmark, skips to the specific time and rotational position associated with the bookmark. Thus, the virtual-reality editing system allows for immediate navigation to a specific time and rotational position of virtual-reality content without requiring manually scrolling through the virtual-reality content.

Moreover, in one or more embodiments, the virtual-reality editing system provides controls that provide a top-down 360-degree view of any point (e.g., video frame) of the virtual-reality content. The top-down view of the virtual-reality video provides a visualization of all horizontal perspectives of virtual-reality content and enables a user to more easily locate interesting content within the virtual-reality display. This top-down 360-degree view facilitates convenient editing of the virtual-reality video by enabling quick identification of perspectives of the display that would be most interesting. For example, in one or more embodiments, the virtual-reality editing system provides the top-down view in connection with one or more rotational alignment controls to enable alignment of adjacent clips or sections of virtual-reality content.

The virtual-reality editing system provides a number of advantages over existing systems for editing virtual-reality content. For example, by providing an editing interface in conjunction with a display of a virtual-reality content via a virtual-reality device, the virtual-reality editing system enables simultaneous editing and previewing of virtual-reality content. Thus, the virtual-reality editing system prevents requiring users to switch back and forth between the virtual-reality display and a converted 2D display of the virtual-reality content.

As used here in "virtual-reality content" refers to digital content that includes an enlarged field of view. As an example, in one or more embodiments, virtual-reality content refers to an image or a video that includes a field of view that extends beyond 180 degrees (i.e., the typical field of view of a pair of human eyes). In one or more embodiments, virtual-reality content includes 360-degree audio-visual content or in other words content with 360 degrees of a horizontal field of view. Virtual-reality content items can include a digital image, video, website, webpage, user interface, menu item tool menu, magazine, slideshow, animation, social post, comment, blog, data feed, audio, advertisement, vector graphic, bitmap, document, any combination of one or more of the foregoing, or other electronic content.

One example of virtual-reality content is a "virtual-reality video." As used herein, "virtual-reality video" refers to a spherical panorama video that portrays greater than 180 degrees of a horizontal field of view and at least 180 degrees of a vertical field of view. For instance, a virtual-reality video includes a panorama video captured by a digital camera that portrays a representation of content in front of, behind, and to the sides of the digital camera. Alternatively, in one or more embodiments, a virtual-reality video refers to a set of multiple videos (e.g., captured by one or multiple digital cameras) that are stitched together to provide an enlarged field of view. Additionally, while one or more embodiments described herein relate specifically to editing and previewing virtual-reality videos, features and functionalities described herein with regard to editing and previewing virtual-reality videos can similarly apply to other types of virtual-reality content (e.g., spherical panorama digital images).

As used herein a "virtual-reality display" or "display within a virtual-reality environment" refers to displaying virtual-reality content via a virtual-reality device. In other words, "virtual-reality display" or "display within a virtual-reality environment" refers to a three-dimensional display of virtual-reality content rather than a two-dimensional display of virtual-reality content. For example, a virtual-reality display includes both a portion of the virtual-reality content within an immediate field of view (e.g., a displayed portion) and any portion of the virtual-reality content outside the immediate field of view (e.g., a peripheral portion). In other words, a virtual-reality display includes both portions that are currently visible and in front of the user as well as those portions of the virtual-reality content to the side and behind the user that are not currently within the field of view provided by the virtual-reality device.

Additional detail will now be provided regarding the virtual-reality editing system in relation to illustrative figures portraying exemplary embodiments. In particular, FIG. 1 illustrates a virtual-reality editing environment 100 including a client device 102 and virtual-reality device 104 (e.g., a virtual-reality headset) that enables a user 106 to simultaneously view and modify virtual-reality content in a virtual-reality environment. As shown in FIG. 1, the client device 102 includes a virtual-reality editing system 108 implemented thereon. In general, the client device 102 and virtual-reality device 104 enable the user 106 to modify virtual-reality content and preview modifications to the virtual-reality content by selecting various controls of an editing interface displayed over a portion of a display of the virtual-reality content by the virtual-reality device 104.

As shown in FIG. 1, the virtual-reality editing environment 100 includes a virtual-reality device 104 that provides a display of a virtual-reality content within a virtual-reality environment. Along similar lines, the client device 102 can provide a conventional 2D display of the virtual-reality content via a display screen. For example, FIG. 1 illustrates two views 110*a*, 110*b* of the same frame from a virtual-reality video. In particular, the virtual-reality device 104 device provides a virtual-reality display 110*a* of the frame, while the computing device provides a conventional warped 2D display 110*b* of the frame.

As shown, the virtual-reality display 110*a* of the frame looks very different than the warped 2D display 110*b* of the frame. In particular, when viewing only the warped 2D display 110*b* of the frame, it can be difficult to appreciate various features of the frame. Furthermore, due to the warped horizon and other warped features of the warped 2D display 110*b* of the frame, viewing the warped 2D display 110*b* of the frame is a dramatically different experience than viewing the virtual-reality display 110*a* of the frame.

In one or more embodiments, the virtual-reality device 104 refers to an inertial measurement device that generates a digital, three-dimensional representation of a three-dimensional space. In one or more embodiments, the virtual-reality device 104 includes a computing device (e.g., a headset or head-mounted display) that generates a three-dimensional view of a virtual environment that simulates a user's physical presence through a generated sensory experience.

Alternatively, in one or more embodiments, the virtual-reality device 104 includes a wearable device that converts a two-dimensional version of a virtual-reality content to a virtual-reality display when worn by the user 106. As an example, a virtual-reality device 104 can include a low-cost wearable headset (e.g., cardboard virtual-reality headset) coupled to or positioned relative to a display of the client device 102 (e.g., a mobile device) that provides a virtual-reality display of the virtual-reality video to the user 106 by filtering a two-dimensional display of the virtual-reality content.

The client device 102 can refer to any electronic device (e.g., user device) that facilitates providing a display of a virtual-reality video to the user 106. Examples of client devices can include, but are not limited to, mobile devices (e.g., smartphones, tablets, smart watches), laptops, desktops, or other type of computing device, such as those described below in connection with FIG. 13. Additionally, one or more features or functionalities described herein with regard to the virtual-reality editing system 108 can be implemented by the client device 102, the virtual-reality device 104, or a combination of multiple devices.

Figure 2A:
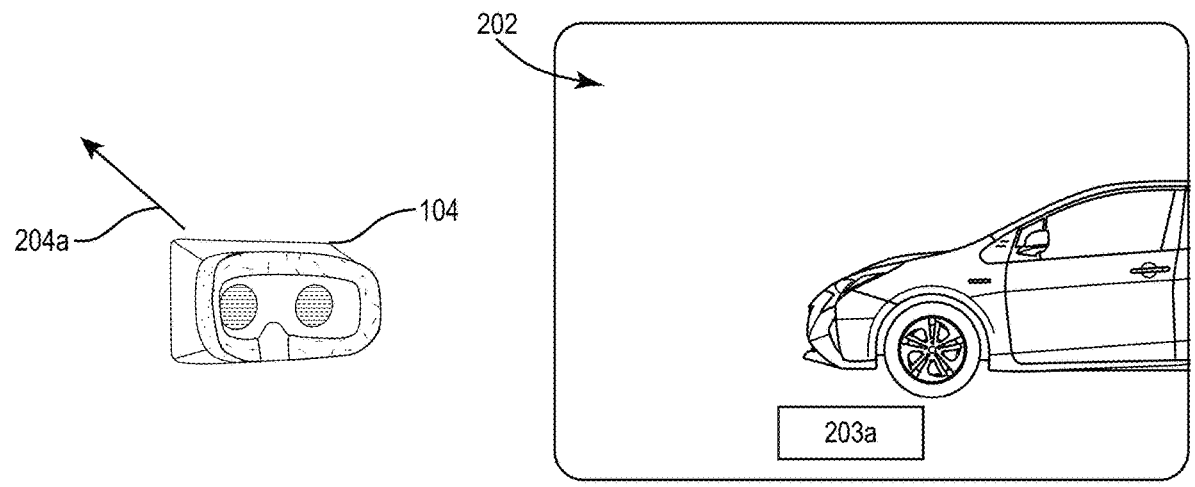
FIGS. 2A-2B illustrate a representation of a display of a virtual-reality video based on movement of a virtual-reality device in accordance with one or more embodiments.
Figure 2B:
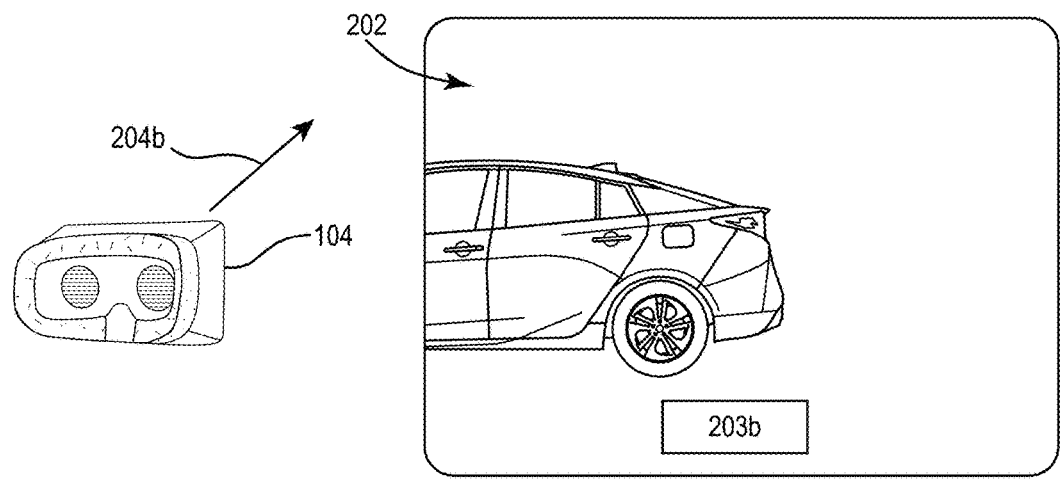

As mentioned above, the virtual-reality editing system 108 can provide a display of a virtual-reality video via the virtual-reality device 104. In particular, as shown in FIGS. 2A-2B, the virtual-reality editing system 108 provides a virtual-reality display 202 via the virtual-reality headset 104. The virtual-reality display 202 includes a 360-degree representation of a virtual-reality video including a displayed portion and peripheral portion of the video content. Thus, in one or more embodiments, providing the virtual-reality display includes providing both the displayed portion and peripheral portion of the video content to the user 106 via the virtual-reality device 104.

As used herein, the "displayed portion" refers to viewable content of the virtual-reality video within an immediate field of view provided by the virtual-reality device 104. For example, the displayed portion can refer to any content directly in front and/or within a defined field of view provided by the virtual-reality device 104. Further, as used herein, the "peripheral portion" refers to content of the virtual-reality video outside the direct field of view provided by the virtual-reality device 104. For example, the peripheral portion can refer to any content to the side or behind the field of view (e.g., any content that is not part of the displayed portion).

During use of the virtual-reality device 104, the virtual-reality editing system 108 provides a different displayed portion and peripheral portion of the virtual-reality video based on movement of the virtual-reality device 104. For example, FIG. 2A illustrates a first displayed portion 204*a* of the virtual-reality display 202 corresponding to a first orientation 204*a* of the virtual-reality device 104. Further, FIG. 2B illustrates a second displayed portion 203*b* of the virtual-reality display 202 corresponding to a second orientation 204*b* of the virtual-reality device 104. In one or more embodiments, the displayed portions 203*a-b* of the virtual-reality display 202 represent different displayed portions 203*a-b* based on a horizontal rotation of the virtual-reality device 104 from the first orientation 204*a* to the second orientation 204*b*.

Thus, as shown in FIGS. 2A-2B, movement of the virtual-reality device 104 from the first orientation 204*a* to the second orientation 204*b* (e.g., left to right) causes a car in the video frame to move from the right side of the first displayed portion 203*a* to the left side of the second displayed portion 203*b*. In addition, in both FIGS. 2A and 2B, the virtual-reality display 202 includes portions of the car in both the displayed portion and the peripheral portion. For example, in FIG. 2A, the front part of the car lies within the first displayed portion 203*a* while the back part of the car lies in the peripheral portion. In contrast, in FIG. 2B, the front part of the car lies in the peripheral portion while the back part of the car lies within the second displayed portion 203*b*.

Figure 3:
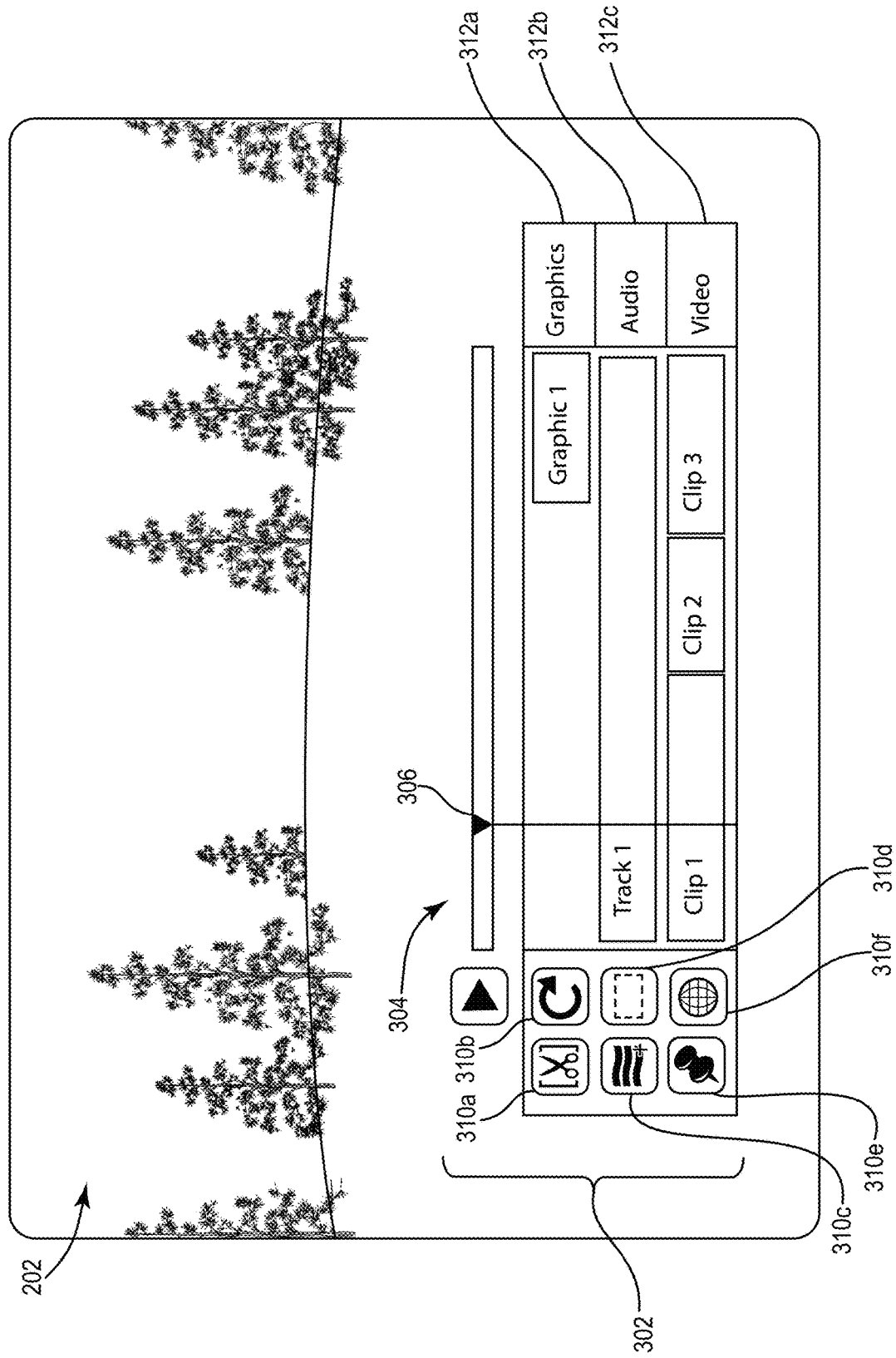
FIG. 3 illustrates an example editing interface provided over a display of virtual-reality content within a virtual-reality environment in accordance with one or more embodiments.

As mentioned above, the virtual-reality editing system 108 provides an editing interface 302 over a portion of the display of the virtual-reality video. For example, FIG. 3 illustrates a displayed portion of a virtual-reality display 202 and an editing interface 302 displayed over the displayed portion. As shown in FIG. 3 (and as further shown in FIGS. 4A-8B), the editing interface 302 includes a number of controls for implementing and previewing edits to the virtual-reality video.

For example, the editing control interface 302 shown in FIG. 3 includes a control panel 308 of editing control icons 312*a-f* representative of a number of editing controls available for editing virtual-reality content while wearing the virtual-reality device 104. Examples of the editing control icons 312*a-f* include a trim icon 310*a*, a rotational alignment icon 310*b*, a vignetting icon 310*c*, a graphic icon 310*d*, a bookmark icon 310*e*, and a top view icon 310*f*. As will be described in further detail below, each of the editing control icons 310*a-f* correspond to different controls for implementing and previewing edits to the virtual-reality video within a virtual-reality environment. In one or more embodiments, one or more of the editing control icons 310a-f are selectable buttons that activate different editing controls and previews described herein. Alternatively, one or more of the editing control icons 310a-f simply serve to illustrate various features and functionality provided by the virtual-reality editing system 108.

In addition, as shown in FIG. 3, the editing control interface 302 includes a scroll bar 304 and position icon 306 that enables scrolling or scrubbing through the virtual-reality video. For example, the user 106 can select the position icon 306 to manually scrub through the virtual-reality video at a speed corresponding to movement of the position icon 306 relative to the length of the scroll bar 304. In one or more embodiments, the virtual-reality display changes based on the current position of the position icon 306 along the scroll bar 304 and in accordance with a direction of the virtual-reality device 104. Thus, in addition to selecting the position icon 306 and scrolling through the virtual-reality video, the user 106 can also change a direction of the virtual-reality device 104 (e.g., by moving the user's head) to further modify the virtual-reality display 202 while scrolling through the virtual-reality video.

As further shown in FIG. 3, the virtual-reality editing system 108 allows for movement of the position icon 306 along the scroll bar 304 with respect to different layers of the virtual-reality video. For example, in one or more embodiments, the virtual-reality video includes layers 312a-c including a graphics layer 312a, an audio layer 312b, and a video layer 312c that make up the virtual-reality content item (e.g., the virtual-reality video file). As shown in FIG. 3, the respective layers 312a-c can include data associated with respective portions of the virtual-reality video. Further, in one or more embodiments, the virtual-reality editing system 108 allows for interaction with each of the respective layers shown in the editing interface 302 thus causing the virtual-reality editing system 108 to insert, cut, shift, or otherwise modify sections of respective layers of the virtual-reality video. In one or more embodiments, features and functionality described with respect to a particular layer 312a-c can similarly apply to other types of layers 312a-c. For example, one or more principles for inserting, cutting, shifting, or otherwise modifying the video layer 312c can similarly apply to the graphics layer 312a and/or the audio layer 312b.

As shown in FIG. 3, the graphics layer 312a includes a graphic displayed within the virtual-reality display 202 toward the end of the virtual-reality video. In one or more embodiments, the graphic is associated with a particular location (e.g., time and direction) within the virtual-reality video and is displayed only if the virtual-reality device 104 is facing a direction that includes the graphic. Alternatively, in one or more embodiments, the virtual-reality editing system 108 displays the graphic at a fixed position within the displayed portion of the virtual-reality display 202 over the portion of the graphic section indicated in the graphic layer 312a. Additional detail with regard to placing and modifying a graphic within the virtual-reality display is described in further detail below in connection with FIGS. 6A-6B.

As further shown in FIG. 3, the virtual-reality video includes an audio layer 312b. In particular, the audio layer 312b includes a track of audio for the entire virtual-reality video. In one or more embodiments, the virtual-reality editing system 108 enables insertion of one or more audio tracks. In addition, in one or more embodiments, the virtual-reality editing system 108 enables overlapping of a second audio track over a first audio track to produce an audio layer 312b including multiple overlapping audio tracks. In addition, the virtual-reality editing system 108 allows for division of the audio track into multiple sections.

As shown in FIG. 3, the virtual-reality video further includes a video layer 312c. Similar to other layers, the virtual-reality video can include any number of sections (e.g., video clips) of the video layer 312c. As shown in FIG. 3, the video layer 312c includes a first clip, second clip, and third clip. In one or more embodiments, each of the clips refer to adjacent or non-adjacent sections of the same video (e.g., the same video file). For example, in one or more embodiments, the first clip and second clip refer to two clips from the same video. Alternatively, in one or more embodiments, the clips refer to video clips from different videos.

Also similar to other layers, the virtual-reality editing system 108 allow for interaction with the editing interface 302 to shift, remove, insert, or otherwise modify each of the respective sections of the video layer 312c. For example, in response to user activation of the trim control icon 310a, the virtual-reality editing system 108 can activate editing controls that enable interaction with the video layer 312c to manipulate different video clips. In particular, in one or more embodiments, the virtual-reality editing system 108 manipulates a video clip in response to the user 106 selecting and dragging a front or back handle of a video clip. In addition, in one or more embodiments, the virtual-reality editing system 108 enables splitting of an individual section (e.g., video clip) into multiple sections.

The virtual-reality editing system 108 can allows for interaction with the editing interface 302 and virtual-reality display 202 using a variety of input methods. For example, in one or more embodiments, the virtual-reality editing system 108 utilizes a conventional keyboard, mouse, mousepad, touchscreen, joystick, or other physical input device. For instance, the virtual-reality editing system 108 can detect movement of a cursor that appears over the displayed portion of the virtual-reality display 202 and selection of one or more of the controls of the editing interface 302 via user input. Alternatively, in one or more embodiments, the virtual-reality device 104 enables modification of the virtual-reality display 202 and/or controls via forward, backward, side-to-side, or tilting motions of the virtual-reality device 104. In one or more embodiments, the virtual-reality editing system 108 detects movement of the user's hands or other device to detect and process various user inputs.

In addition, as shown in FIG. 3, the editing interface 302 includes a two-dimensional interface including controls displayed at a fixed location over the displayed portion of the virtual-reality display 202. For example, in one or more embodiments, the editing interface 302 remains at a fixed position rather than moving relative to movement and direction of the virtual-reality device 104. Notwithstanding the fixed position of the editing interface 302, in one or more embodiments, the virtual-reality editing system 108 causes movement of the virtual-reality display 202 relative to movement of the virtual-reality device 104 in the background of the editing interface 302. Thus, as shown in FIG. 3, the display within the field of view provided by the virtual-reality device includes both a changing background of the virtual-reality display 202 and a fixed editing interface 302 including the controls that enable the user 106 to implement and preview edits to the virtual-reality video.

Some or all of the editing interface 302 can be relocated (e.g., in response to a directional user input) to overlap any part of the displayed portion of the virtual-reality display 202. In addition, the editing interface 302 can include a flat rectangular display or, alternatively, partially bend in accordance with the curvature of the 360-degree virtual-reality display 202. Moreover, in one or more embodiments, the editing interface 302 is partially opaque so as to enable the user 106 to view the overlapping displayed portion of the virtual-reality display 202 behind the partially opaque editing interface 302. Alternatively, in one or more embodiments, the editing interface 302 includes a solid display that completely blocks a portion of the virtual-reality display 202.

As mentioned above, the editing interface includes one or more rotational controls that rotate one or more sections (e.g., video clips) of the virtual-reality video in response to receiving user input with respect to the editing interface 302. In particular, the virtual-reality editing system 108 enables a user 104 to identify edits to different sections (e.g., adjacent video clips) that avoid awkward jumps in the virtual-reality video when a virtual-reality display 202 transitions from a first section/clip to a second section/clip. For example, virtual-reality videos that include multiple clips often cause disorientation for the user 104, particularly where interesting content occurs at different perspectives in the different video clips. In particular, users often become disoriented when interesting content occurs within a displayed portion of the virtual-reality display 202 for a first video clip, but occurs within the peripheral portion of the virtual-reality display 202 for a second video clip (e.g., after transitioning from the first video clip to the second video clip).

Figure 4A:
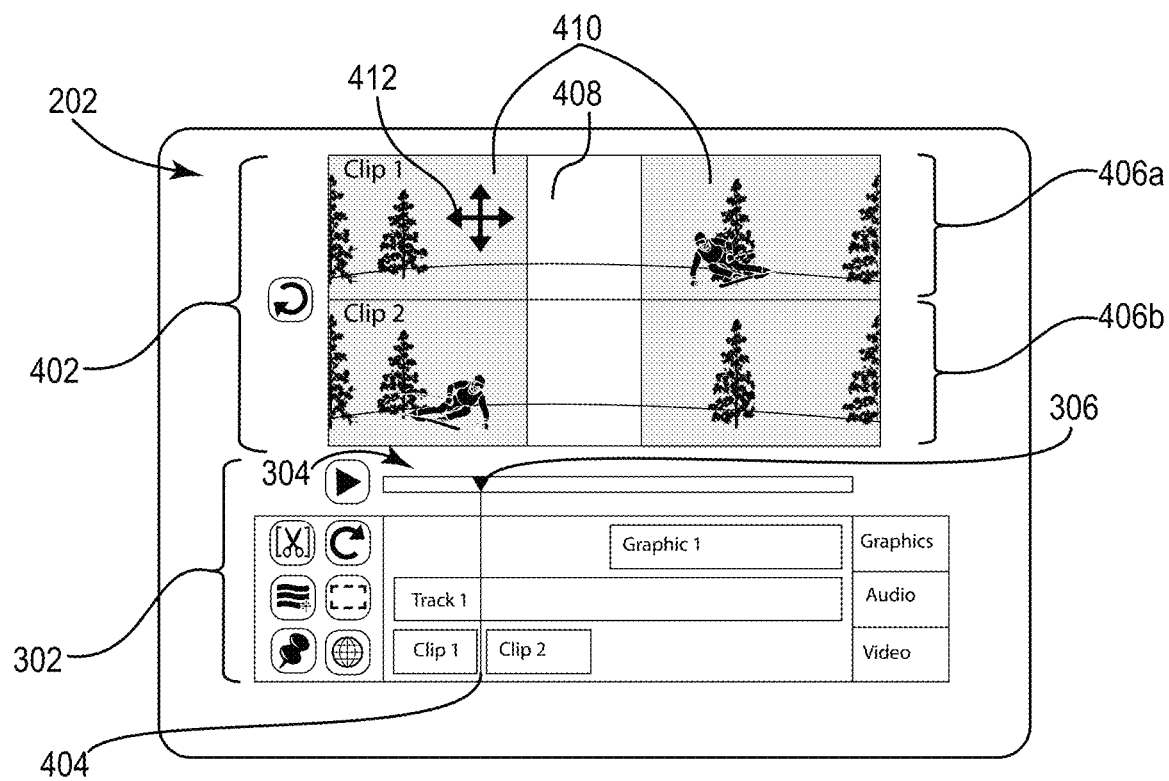
FIG. 4A-4C illustrates an example interface for aligning clips of a virtual-reality video in accordance with one or more embodiments.
Figure 4B:
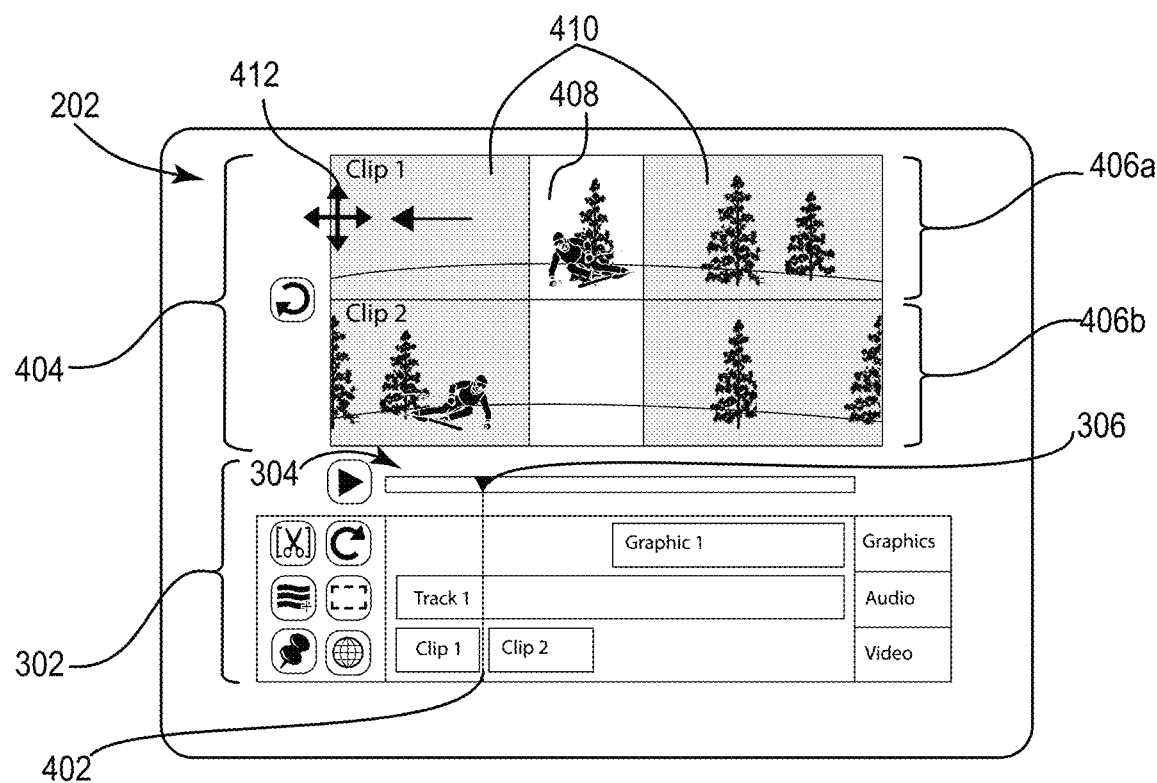
Figure 4C:
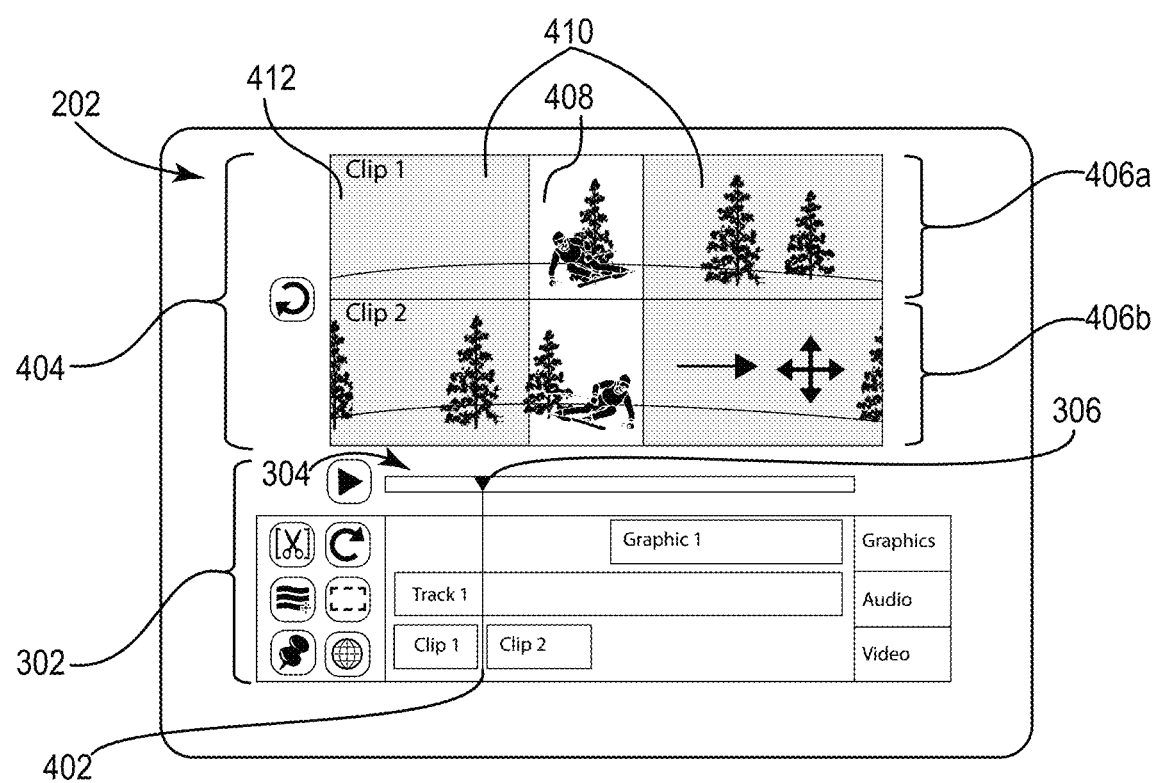

As such, the virtual-reality editing system 108 enables selective rotation of discrete sections of the virtual-reality video to avoid disorientation caused by unexpected jumps between different sections of a virtual-reality video. For example, FIGS. 4A-4C illustrate an example embodiment of controls for rotating a first clip of the virtual-reality video and a second clip of the virtual-reality video at a transition from the first clip to the second clip. In particular, upon detecting a user selection of the rotational alignment icon 310b, the virtual-reality editing system 108 provides an alignment preview 402 including video frames from a first video clip and second video clip. For example, as shown in FIG. 4A, the virtual-reality editing system 108 provides the alignment preview 402 including the last frame of a first video clip and the first frame of a second video clip. As further shown, the position icon 306 of the scroll bar 304 is positioned at a break/transition point 404 between the first video clip and the second video clip.

As shown in FIG. 4A, the alignment preview 402 includes a first clip preview 406a and a second clip preview 406b. Each of the clip previews 406a-b include a representation of a frame of the respective video clips. For example, the first clip preview 406a includes a spherical panorama image representative of the last frame of the first video clip. The second clip preview 406b includes a spherical panorama image representative of the first frame of the second video clip. In other words, the first clip preview 406a and the second clip preview 406b represent two adjacent frames of video clips of the video layer 312c of the virtual-reality video.

As further shown in FIG. 4A, the first clip preview 406a and the second clip preview 406b include a display preview 408 representative of the displayed portion of the virtual-reality display 202 and a peripheral preview 410 representative of the peripheral portion of the virtual-reality display 202. As shown in FIG. 4A, the peripheral preview 410 of the clip previews 406a-b is grayed out to visually indicate portions of the clip previews 406a-b that correspond to the displayed portion and peripheral portion of the virtual-reality display 202 (in accordance with a current direction of the virtual-reality device 104).

In one or more embodiments, the video clips have an initial or default orientation. For example, in one or more embodiments, the virtual-reality editing system 108 orients the first clip and the second clip such that a true north of each clip aligns. As used herein, "true north" of a virtual-reality video or video clip refers to a reference direction of a virtual-reality video or individual video clip. For example, the true north of a virtual-reality video may refer to a default direction when the virtual-reality video is initially recorded. As another example, the true north of a virtual-reality video may refer to an initial direction within the virtual-reality video display 202 of one or more detected objects. Alternatively, in one or more embodiments, the true north refers to a direction manually identified by a user (e.g., creator).

As a result of the default orientations for each of the video clips, the first video clip and second video clip may have content occurring at different positions along the 360-degree orientation of the respective video clips. For example, as shown in FIG. 4A, the first video clip has a skier in motion between the display preview 408 and the perspective preview 410 to the right of the display preview 408. In contrast, the second video clip has a skier in the perspective preview 410 to the left of the display preview.

In one or more embodiments, the control interface 302 includes a cursor icon 412 that enables the user 104 to view a corresponding virtual-reality display 202 of whichever clip preview 406a-b is selected. In particular, as shown in FIG. 4B, the virtual-reality display 202 corresponds to the video clip over which the cursor icon 412 is positioned. For example, in one or more embodiments, the virtual-reality editing system 108 causes the virtual-reality device 104 to provide the virtual-reality display 202 of the first clip (e.g., the frame of the first clip) in response to detecting that the cursor icon 412 is positioned over the first clip preview 406a. As further illustrated in FIG. 4C, the virtual-reality editing system 108 can cause the virtual-reality device to provide the virtual-reality display 202 of the second clip (e.g., the frame of the first clip) upon detecting that the cursor icon 412 is positioned over the second clip preview 406b.

As an alternative to providing a display in accordance with a position of the cursor icon 412, the virtual-reality editing system 108 can cause the virtual-reality device 104 to display a portion of the first clip or the second clip in accordance with a position or tilt of the virtual-reality device 104. For example, in one or more embodiments, the virtual-reality display 202 includes a frame from the first video clip if the virtual-reality device 104 is tilted upward (e.g., above a threshold angle relative to horizontal). Alternatively, in one or more embodiments, the virtual-reality display 202 includes a frame from the second video clip if the virtual-reality device 104 is tilted upward (e.g., below a threshold angle relative to horizontal).

In one or more embodiments, the virtual-reality editing system 108 rotates a perspective of the virtual-reality display 202 in response to user interaction with the control interface 302 and particularly the alignment preview 402. For example, the virtual-reality editing system 108 can reposition the displayed portion of the virtual-reality display 202 in response to the user 106 selecting the first clip preview 406a and shifting the first clip preview 406a to the right or left. As shown in FIGS. 4A-4B, the virtual-reality editing system 108 rotates the perspective of the virtual-reality display 202 in response to the user 106 selecting the first clip preview 406a (e.g., with the cursor icon 412) and dragging the first clip preview 406a to the left. This ensures that an object (e.g., a skier) to move within a displayed portion of the virtual-reality display 202.

As an alternative to clicking and dragging the clip previews 406a-b, the virtual-reality editing system 108 can shift one or both of the clip previews 406a-b via movement of the virtual-reality device 106. For example, while the cursor icon 412 is positioned over the first clip preview 406a (or while the first clip preview 406a is otherwise selected), the virtual-reality display 202 and first clip preview 406a may be shifted via horizontal rotation of the virtual-reality device 104. For example, the movement of the first clip preview 406a from right to left may be caused by rotational movement of the virtual-reality device 104 from left to right, thus causing the car to move from the peripheral portion (e.g., the peripheral preview 410) to the displayed portion (e.g., display preview 408) of the virtual-reality display 202 as shown in FIG. 4B.

Similar to causing the first clip preview 406a to shift from right to left using the cursor icon 412 and/or movement of the virtual-reality device 104, the virtual-reality editing system 108 can similarly enable shifting of an orientation of the second video clip in reference to the first video clip. For example, as shown in FIG. 4C, the virtual-reality editing system 108 rotates an orientation of the second video clip in response to a user input shifting the second clip preview 406b from left to right. In this way, the virtual-reality editing system 108 causes the skier from the second video clip to appear within the display portion of the virtual-reality display 202 rather than the peripheral portion when the video cuts from the first video clip to the second video clip at the break 404.

In this way, the virtual-reality editing system 108 enables a user 106 to interact with the clip previews 406a-b to change an orientation of one or multiple adjacent clips of a virtual-reality video. In particular, using one or more techniques described above, the virtual-reality editing system 108 normalizes or otherwise redefines the true north of one or both adjacent video clips to align interesting content from both of the video clips to adjacent displayed portions of the virtual-reality display 202 for each of the respective clips. This rotational alignment avoids awkward cuts in the virtual-reality video between video clips where interesting content jumps unexpectedly from the displayed portion to the peripheral portion of the virtual-reality display 202.

As a result of the rotational edits, the transition between the first video clip and the second video clip of the virtual-reality video will include the skier from the first video clip aligned with the skier of the second clip. In one or more embodiments, the virtual-reality editing system 108 transitions between the first clip and the second clip by instantly snapping from the orientation of the first clip to the orientation of the second clip. Thus, the transition from the rotational direction of the first clip to the rotational direction of the second clip would be instantaneous.

Alternatively, in one or more embodiments, the virtual-reality editing system 108 transitions between the first clip and second clip gradually. In particular, rather than an instantaneous (and potentially abrupt) snap from the first orientation of the first video clip to the second orientation of the second video clip, the virtual-reality editing system 108 instead causes the virtual-reality display 202 to gradually rotate from the first direction at the end of the first clip to the second direction at the beginning of the second clip. As an example, where the difference in rotation between the video clips is 30 degrees, the virtual-reality editing system 108 may cause the virtual-reality display to rotate 30 degrees during the transition between the first clip and second clip. This rotation can occur entirely during the first clip or second clip or, alternatively, over portions of both the first clip and the second clip. The gradual rotation can also occur over a predefined period of time (e.g., 1-5 seconds).

Gradually rotating the perspective of the virtual-reality display 202 may be particularly beneficial when displaying different video clips having similar backgrounds. For example, where the first clip and second clip are filmed from the same location, but include video clips from non-consecutive portions of the video footage, gradually rotating from a first rotation of the first clip to the second rotation of the second clip may provide an appearance of a continuous video of a single scene. In one or more embodiments, the virtual-reality editing system 108 enables the user 104 to select an instantaneous or gradual rotation. Further, in one or more embodiments, the virtual-reality editing system 108 enables the user 104 to select a speed at which the gradual transition occurs (e.g., a defined time period, a rate of rotation).

In addition to the rotational alignment controls, the virtual-reality editing system 108 includes one or more vignetting controls to reduce potential motion sickness of the user 106. For example, virtual-reality video often induces motion sickness, particularly when working with raw footage that includes shaky or rotated scene motion. This motion is often accentuated when the user 106 scrubs rapidly through the virtual-reality display 202 (e.g., using the scroll bar 304). In addition, while some virtual-reality videos have been stabilized to reduce shaky or rotated scene motion, even stabilized video may include shakiness or jumping when scrubbing rapidly through the virtual-reality video.

Figure 5A:
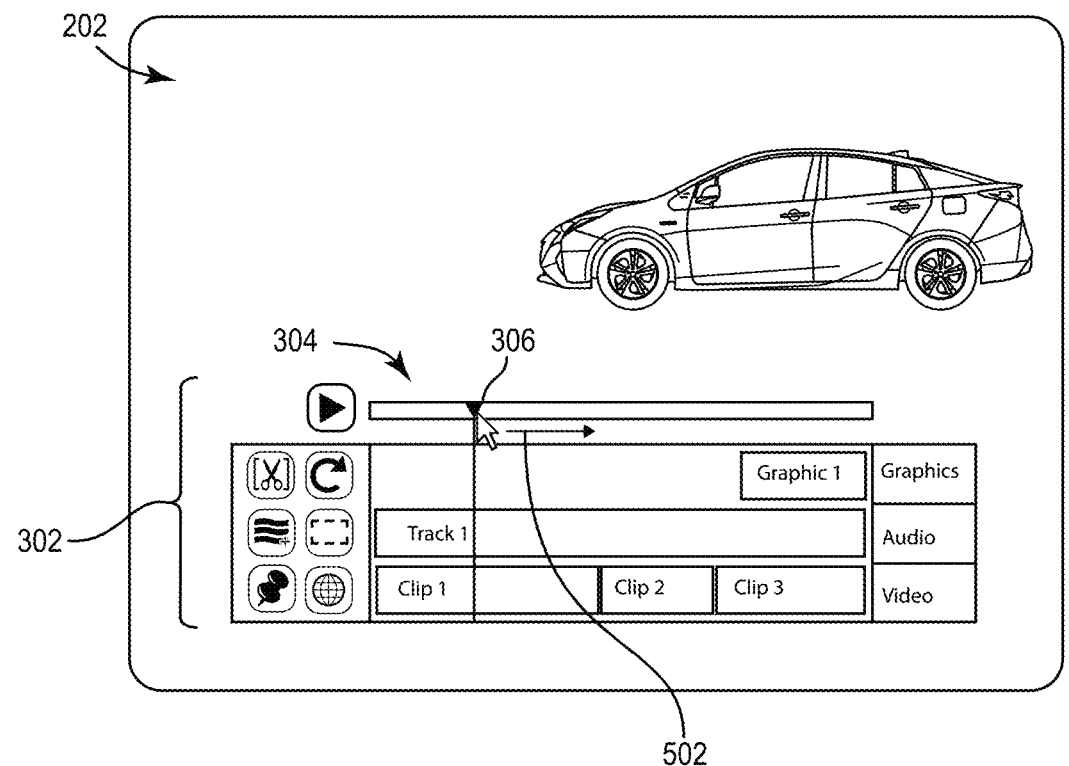
FIGS. 5A-5C illustrates an example interface for narrowing a field of view of a virtual-reality video during scrubbing in accordance with one or more embodiments.

For example, as shown in FIG. 5A, the user 106 can select the position icon 306 on the scroll bar 304 and perform a scrolling or scrubbing action 502 that causes the virtual-reality display 202 to rapidly change. In one or more embodiments, the virtual-reality editing system 108 rapidly changes the virtual-reality display 202 simply as a result of quickly navigating forward in time in accordance with the changing position of the position icon 306. In addition, the virtual-reality editing system 108 can change perspectives of the virtual-reality display (e.g., move from a displayed portion to a peripheral portion) based on movement of the virtual-reality device 104 while the scrolling action 502 occurs.

Figure 5B:
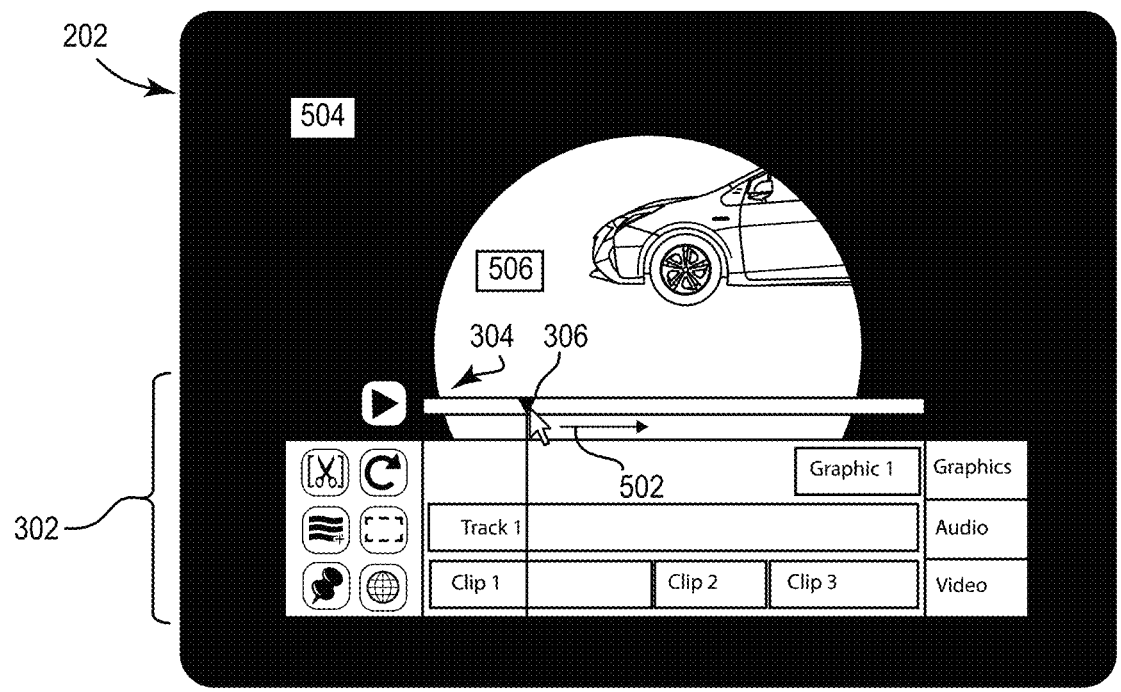

In one or more embodiments, the virtual-reality editing system 108 reduces potential motion sickness by narrowing a field of view of the virtual-reality display 202. For example, as shown in FIG. 5B, the virtual-reality editing system 108 narrows the field of view for the virtual-reality display 202 by displaying a narrowing background 504 that forms a border around a narrowed display 506. In one or more embodiments, the narrowing background 504 includes a black or otherwise dark color that blocks the outer portion of the displayed portion of the virtual-reality display 202. In one or more embodiments, the narrowing background 504 includes any uniform and/or dark color that narrows the focus of the display area 202 and provides the narrowed display 506.

Figure 5C:
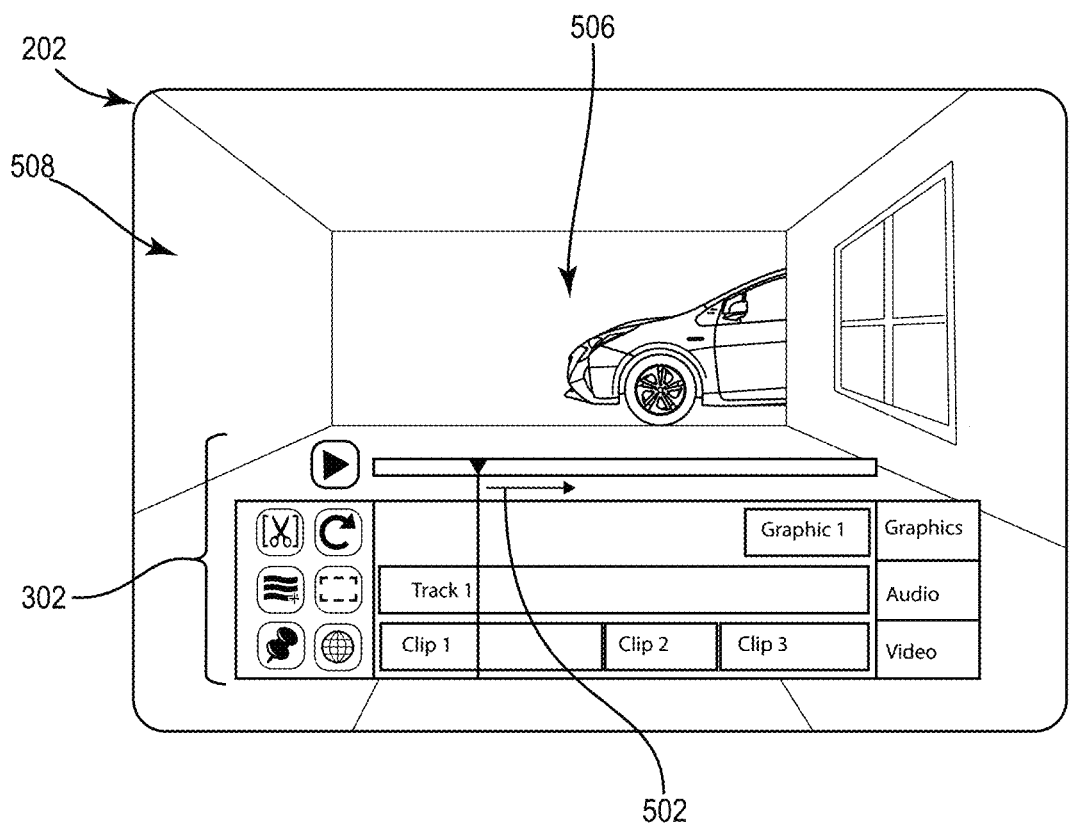

As an alternative to the black or otherwise uniform background 504 shown in FIG. 5B, in one or more embodiments, the virtual-reality editing system 108 provides a virtual background 508 including a background display. For example, as shown in FIG. 5C, the virtual background 508 includes a fixed display of a room. Alternatively, in one or more embodiments, the virtual background 508 includes a background of nature, a park, the sky, or any other background design that simulates an ambient environment for the user 106 of the virtual-reality device 104. In one or more embodiments, the virtual-reality editing system 108 enables the user 106 to select a background scene for the background 508 from a number of scene options.

In one or more embodiments, the virtual-reality editing system 108 provides a virtual background 508 that remains fixed relative to movement of the virtual-reality device 104. For example, the virtual background 508 may remain fixed notwithstanding movement of the virtual-reality device 104 or movement of the virtual-reality display 202. In this way, the virtual-reality editing system 108 provides a non-moving background 508 while the user 106 scrolls through the virtual-reality video, thus reducing potential motion sickness.

Alternatively, in one or more embodiments, the virtual background 508 moves relative to movement of the virtual-reality device 104 to show additional portions (e.g., peripheral portions) of the virtual background 508. For example, if the virtual background includes a room, the user 108 can view peripheral portions of the room by moving the headset while scrolling through the virtual-reality video. In this way, the virtual-reality editing system 108 simulates the environment of the room (or other virtual background), and similarly reduces potential motion sickness.

In one or more embodiments, the narrowed display 506 includes various shapes and sizes. For example, as shown in FIG. 5B, the narrowed display 506 includes a circular or oval shape defined by the narrowing background 504. Alternatively, as shown in FIG. 5C, the narrowed display 506 includes a square or rectangular shape defined by the virtual background 508. It is appreciated that the user 106 can select one of several types of shapes according to the user's preference.

As shown in FIGS. 5B-5C, the virtual-reality editing system 108 displays the backgrounds 504, 508 and the narrowed display 506 behind the editing interface 302. Thus, when the virtual-reality editing system 108 narrows the field of view for the virtual-reality display 202, the virtual-reality editing system 108 provides a full display of the editing interface 302. Nevertheless, in one or more embodiments, the background 504, 508 overlaps and blocks a portion of the editing interface 302.

In one or more embodiments, the virtual-reality editing system 108 narrows the field of view as shown in FIGS. 5A-5C upon detecting that the user 106 is scrolling through the virtual-reality video. In particular, in one or more embodiments, the virtual-reality editing system 108 narrows the field of view in response to detecting the scrolling action 502. For example, in one or more embodiments, the virtual-reality editing system 108 narrows the field of view based on detected scrolling without consideration to the displayed content or to how fast the user 106 is scrolling.

In addition, in one or more embodiments, the virtual-reality editing system 108 narrows the field of view more or less (e.g., to cover a larger or smaller portion of the virtual-reality display 202) based on various triggers or conditions. In one or more embodiments, the virtual-reality editing system 108 narrows the field of view based on one or more characteristics of the scrolling action 502. As an example, in one or more embodiments, the virtual-reality editing system 108 narrows the field of view more or less based on a speed of the scrolling action 502. For instance, in one or more embodiments, the virtual-reality editing system 108 narrows the field of view based on a number of frames/second a scrolling action 502 causes the virtual-reality editing system 108 to scroll through the virtual-reality video. In particular, the virtual-reality editing system 108 narrows the field of view more for a scrolling action 502 resulting in a higher number of scrolled frames/second than for a scrolling action 502 resulting in a lower number of scrolled frames/second. In one or more embodiments, if the scrolling action 502 does not exceed a threshold number of frames/second, the virtual-reality editing system 108 may simply display the entire displayed portion of the virtual-reality display 202 without narrowing the field of view.

In one or more embodiments, rather than narrowing the field of view as a function of the scrolling action 502, the virtual-reality editing system 108 narrows the field of view based on content displayed in the virtual-reality display 202. For example, if a virtual-reality video includes a lot of motion (e.g., camera motion, motion of objects), the virtual-reality editing system 108 can further narrow the field of view than for virtual-reality videos that include little or no motion. Thus, the virtual-reality editing system 108 can narrow the field of view as a function of detected content within the virtual-reality display 202 or detected ambient motion of the virtual-reality video.

As an example of narrowing the field of view based on content of the virtual-reality video, in one or more embodiments, the virtual-reality editing system 108 contracts the field of view based on perceived motion within a display of the virtual-reality video. For instance, the virtual-reality editing system 108 determines an optical flow (e.g., pattern of motion of objects, surfaces, and edges) of the virtual-reality video from frame to frame to estimate the shakiness of the virtual-reality video. In one or more embodiments, the virtual-reality editing system 108 precomputes the optical flow using the Lucas-Kanade method. In particular, the virtual-reality editing system 108 assumes displacement of content of image contents between two nearby frames of the virtual-reality video to be small and constant within a neighborhood of a point or pixel(s) under consideration.

Further, the virtual-reality editing system 108 computes the motion magnitude of the virtual-reality video from the user's viewpoint to determine the rate at which the virtual-reality editing system 108 narrows the field of view. In one or more embodiments, the motion magnitude of the virtual-reality video from the user's viewpoint is expressed as:

$$M_f = \sum_{i=1}^{N} \|V_i\|$$

where N is the number of tracked points in the user's current view and $V_i$ is the motion vector from a current frame (f) to the next frame (f+1) of point i.

In one or more embodiments, a rate at which the virtual-reality editing system 108 narrows the field of view is set to a default rate (e.g., a rate of contraction) between 0 and negative (−) 30 degrees/second based on the determined motion magnitude ($M_f$), thus contracting the field of view faster in choppy scenes while contracting subtly in normal scenes. In one or more embodiments, the rate of contraction is set to zero degrees/second when $M_f$=min ($M_f$) and to −30 degrees/second when $M_f$=max ($M_f$), respectively. In one or more embodiments, min ($M_f$) and max ($M_f$) are precomputed over all $M_f$ of which viewpoints are centered around all tracked points of the virtual-reality video (e.g., prior to launching the virtual-reality video).

Furthermore, when the virtual-reality editing system 108 detects the user 106 scrolling through the virtual-reality video, the virtual-reality editing system 108 speeds up the rate of contraction by multiplying the rate of contraction with the number of video frames changed when scrolling through the virtual-reality video. Thus, scrolling faster through the virtual-reality video will cause the virtual-reality editing system 108 to contract the field of view faster than when the user 106 scrolls at a normal or slower rate. Thus, in one or more embodiments, the virtual-reality editing system 108 narrows the field of view as a function of both content displayed within the virtual-reality display and a rate of scrolling (e.g., scrolled frames/second) through the virtual-reality video.

Figure 6A:
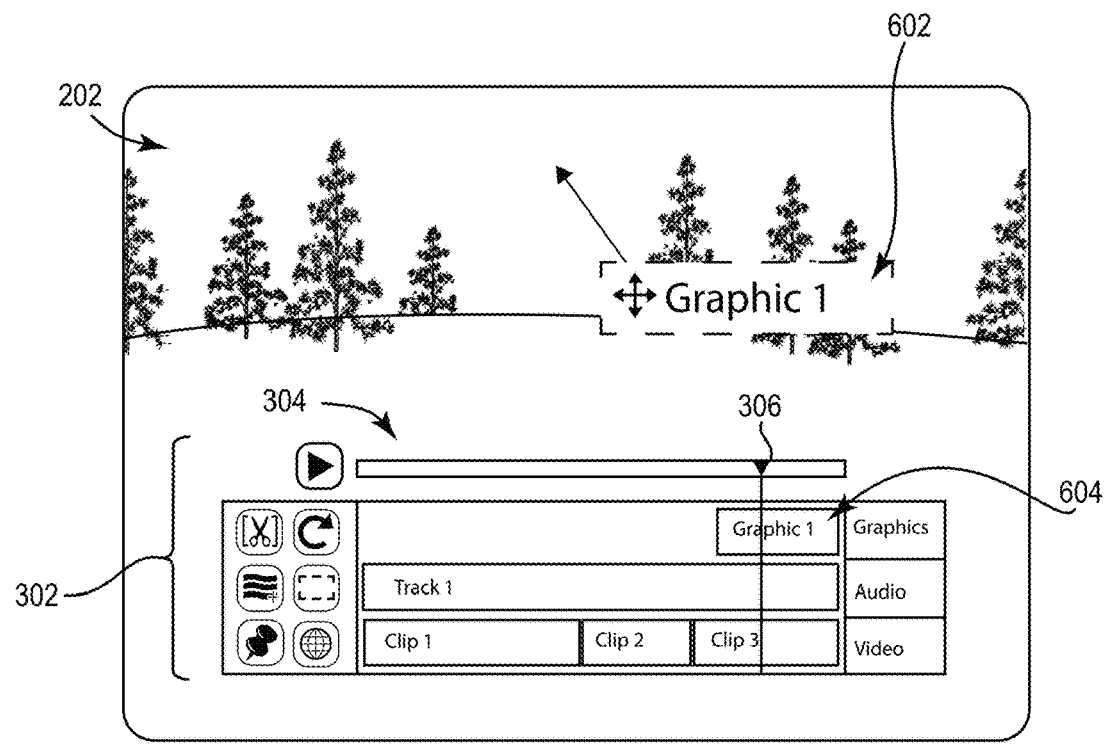
FIGS. 6A-6B illustrate an example interface for modifying a graphic placed over a display of the virtual-reality content in accordance with one or more embodiments.

In addition to controls described above, one or more embodiments of the virtual-reality editing system 108 includes graphic controls. For example, as mentioned above, the virtual-reality video includes a graphic layer 312a that includes a graphic 602 displayed over a portion of the virtual-reality display 202. As shown in FIG. 6A, the graphic 602 is displayed over the virtual-reality display 202 for the duration of a portion of the virtual-reality video indicated by the graphic icon 604 on the editing interface 302. Accordingly, when the position icon 304 is positioned over the graphic icon 604, the virtual-reality display 202 includes the graphic 602.

Figure 6B:
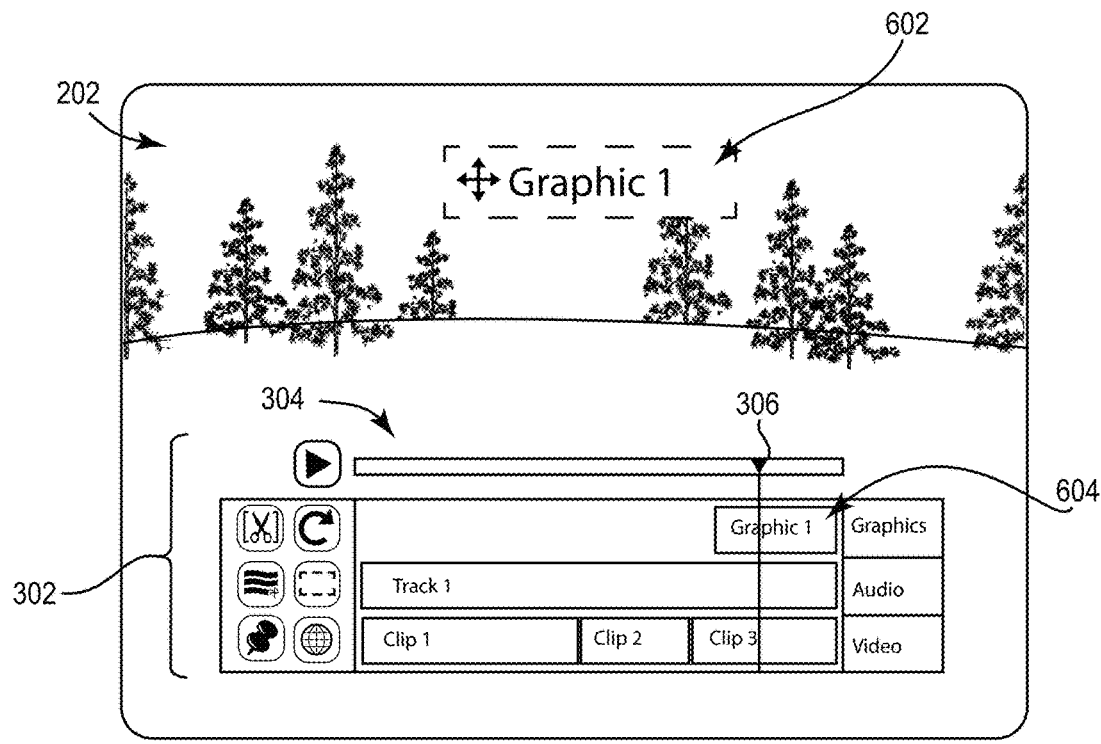

As shown in FIGS. 6A-6B, in response to user input with the virtual-reality display 202, the virtual-reality editing system 108 moves the graphic 602 from a first location to a second location. For example, as shown in FIG. 6A, the virtual-reality editing system 108, in response to user input selecting the graphic 602 and moving a cursor, moves the graphic from a first location (as shown in FIG. 6A) to a second location (as shown in FIG. 6B). Alternatively, in one or more embodiments, the virtual-reality editing system 108 detects user input via other virtual-reality controls including, for example, hand motion or other method for interacting with the virtual-reality display 202.

In one or more embodiments, the virtual-reality editing system 108 displays the graphic 602 at a fixed point on the displayed portion of the virtual-reality display 202. For example, similar to the editing interface 302 that remains fixed relative to movement of the virtual-reality device 104, the graphic 602 can similarly remain displayed at a fixed point independent of a direction or movement of the virtual-reality device 104. Thus, in one or more embodiments, the graphic 602 remains displayed on the displayed portion of the virtual-reality display 202 without moving to the peripheral portion of the virtual-reality display 202.

Alternatively, in one or more embodiments, the virtual-reality editing system displays the graphic 602 at a position within the virtual-reality display 202 that moves within the virtual-reality display 202 relative to movement of the virtual-reality device 104. For example, as shown in FIG. 6B, the graphic 602 is placed at a specific location within the field of view provided the virtual-reality device. As the virtual-reality device 104 moves, the graphic 602 will similarly move as part of the content within the virtual-reality display 202. Thus, if the virtual-reality device 104 rotates horizontally by 180 degrees, the virtual-reality editing system 108 moves the graphic 602 from the displayed portion (e.g., in front of the user 106) to the peripheral portion (e.g., behind the user 106) of the virtual-reality display 202.

In one or more embodiments, the graphic 602 includes text, photos, images, or other content displayed over the top of the virtual-reality display 202. Alternatively, in one or more embodiments, the graphic 602 includes a video or other visual display that plays over the portion of the virtual-reality video corresponding to the graphic icon 604 in the editing interface. In addition, it is appreciated that the virtual-reality video can include any number of graphics over different portions of the virtual-reality display 202.

By providing the graphic 602 over the displayed portion of the virtual-reality display 202, the virtual-reality editing system 108 enables viewing of how the graphic will appear on playback of the virtual-reality video. In addition, by providing a preview of the graphic 602 via the virtual-reality display 202, the virtual-reality editing system 108 avoids conventional desktop approaches that involve manually converting a two-dimensional graphic on a desktop display to the equirectangular projection as seen by the user 106 of the virtual-reality device 104. Alternatively, the virtual-reality editing system 108 provides a real-time preview of the graphic 602 as it will appear within the virtual-reality display 202. In addition, the virtual-reality editing system 108 facilitates display of the graphic 602 on an object or feature within the virtual-reality display 202.

Figure 7A:
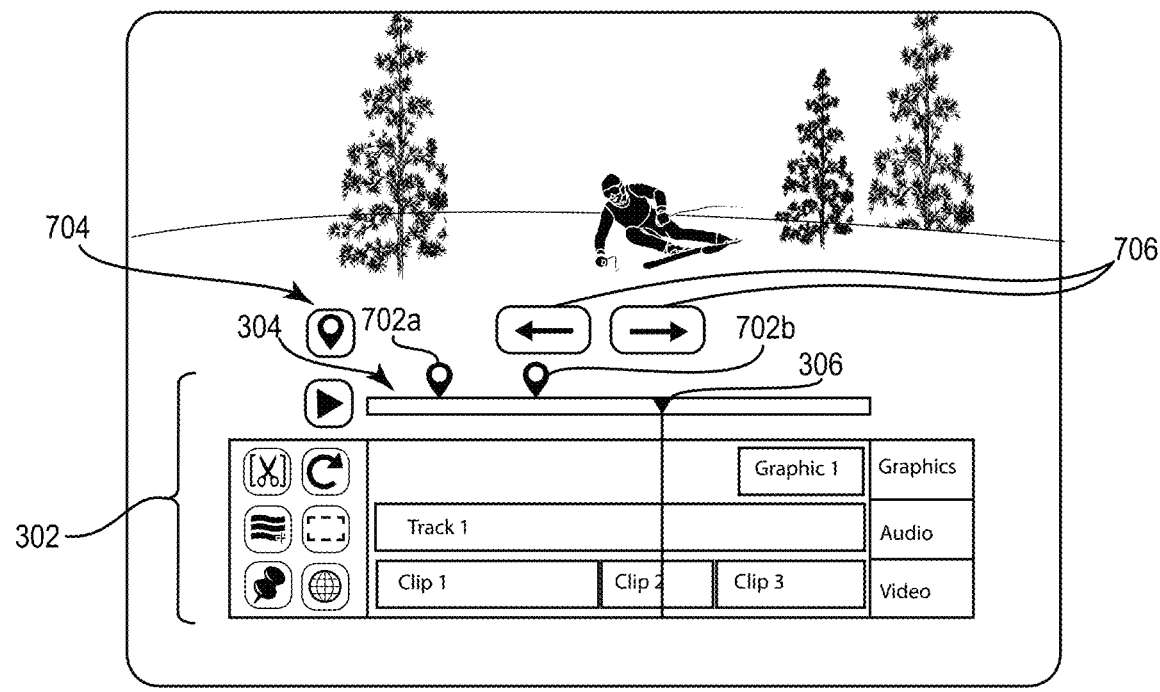
FIGS. 7A-7C illustrate an example interface for adding bookmarks to virtual-reality content in accordance with one or more embodiments.
Figure 7B:
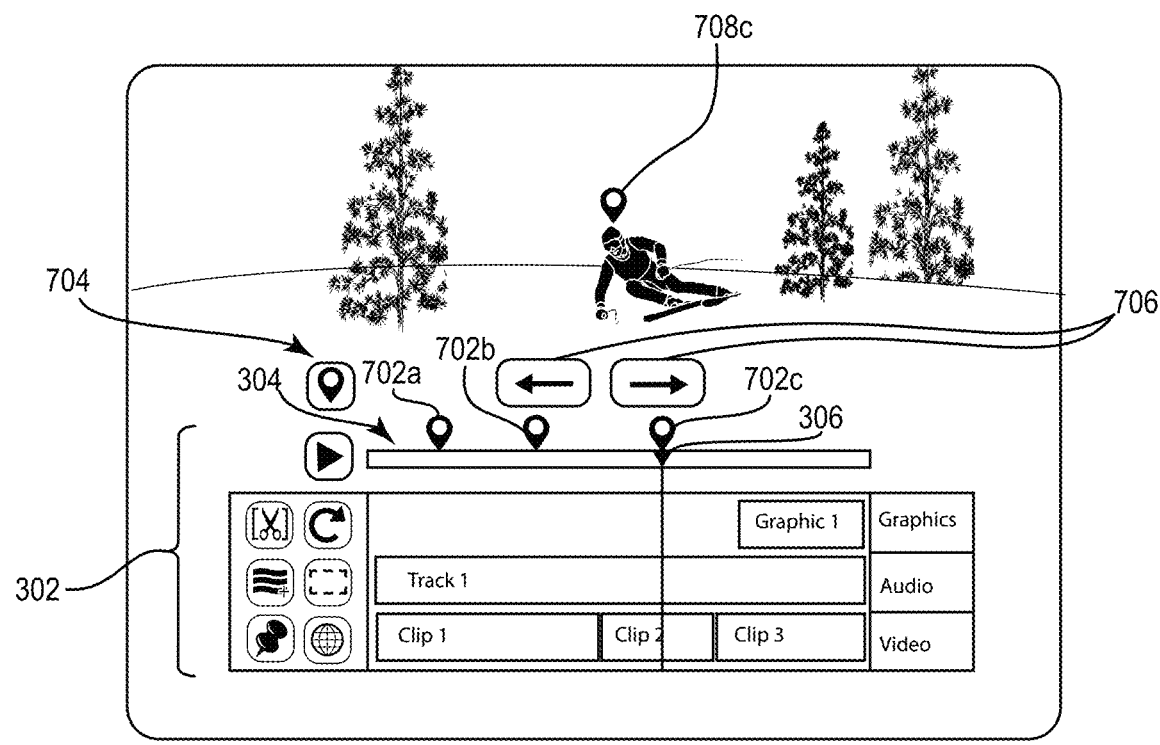
Figure 7C:
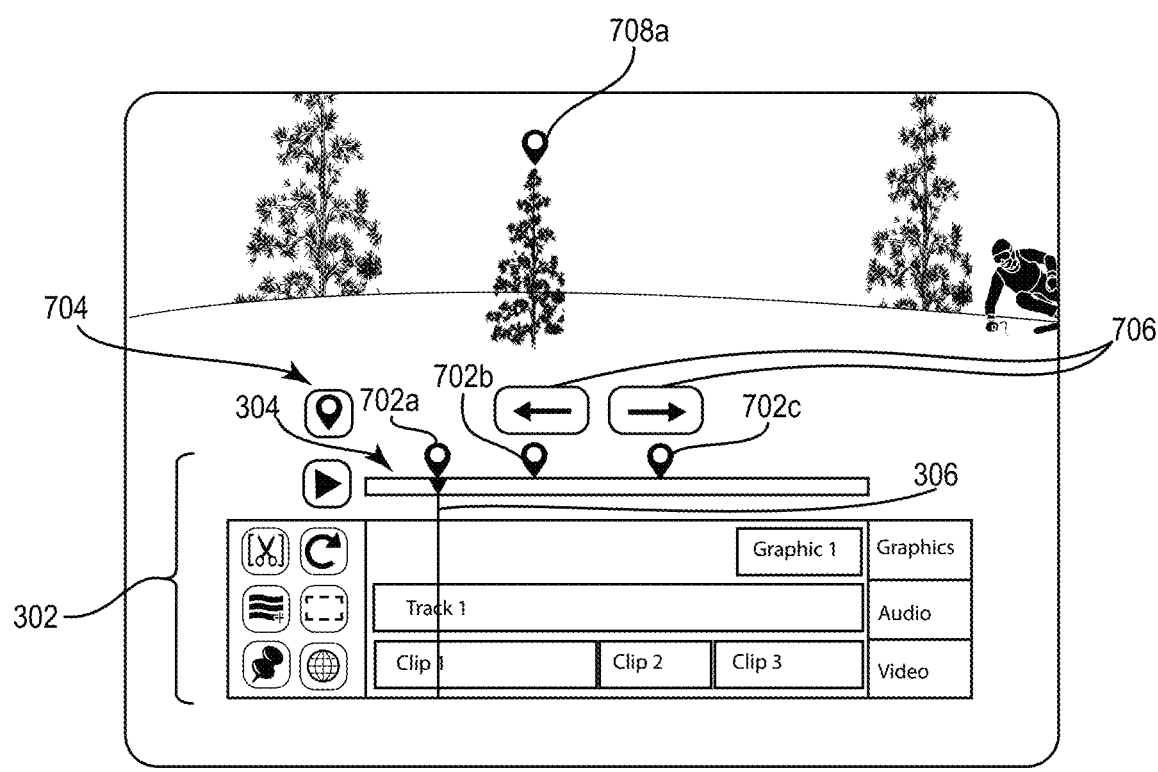

In addition to the controls described above, one or more embodiments of the virtual-reality editing system 108 includes bookmarking controls that facilitate bookmarking positions within the virtual-reality video. For example, as shown in FIGS. 7A-7C, the virtual-reality editing system 108 adds bookmarks 702a-c to different positions of the virtual-reality video. As shown in FIG. 7A, the virtual-reality video includes a first bookmark 702a and a second bookmark 702b. As further shown in FIG. 7B, the virtual-reality editing system 108 can add a third bookmark 702c to the virtual-reality video corresponding to a position of the position icon 306 along the scroll bar 304.

For example, in response to user input selecting the bookmark icon 310e, the virtual-reality editing system 108 initiates the bookmarking interface shown in FIG. 7A. To add a bookmark, the user 106 can scroll through the virtual-reality video and select an add bookmark button 704 to bookmark a position within the virtual-reality video. Upon adding a bookmark, the virtual-reality editing system 108 provides an indication of a position of the bookmark on the scrollbar 304. As shown in FIGS. 7A-7C, the virtual-reality editing system 108 adds the third bookmark 702c in response to selecting the add bookmark button 704 corresponding to the position of the position icon 306 along the scroll bar 304. In addition, as shown in FIG. 7B, the virtual-reality editing system 108 adds a bookmark indicator 708c corresponding to the third bookmark 702c on the scroll bar 304.

The bookmark controls provides for bookmarking a position including both a time of the virtual-reality video as indicated by the position of the position icon 306 (e.g., a specific frame of the virtual-reality video) as well as a position within the virtual-reality display 202. In particular, each of the bookmarks 702a-c can include both a time position within the virtual-reality video and a direction (e.g., horizontal and/or vertical direction) that points to a particular or location within the virtual-reality display 202. In this way, the user 106 can add bookmarks that point to different times and locations within the virtual-reality video.

In addition, the virtual-reality editing system 108 provides one or more bookmarking controls that enables quick navigation to bookmarked points within the virtual-reality video. For example, in one or more embodiments, the virtual-reality editing system 108 navigates to bookmarked locations in response to the user 106 selecting one of the bookmarks 702a-c indicated on the scroll bar 304. For instance, in response to detecting a selection of the first bookmark 702a indicated on the scroll bar 304, the virtual-reality editing system 108 quickly navigates (e.g., skips) to the location and direction of the first bookmark 702a. As shown in FIG. 7C, the virtual-reality editing system 108 displays the object or frame as indicated by the bookmark indicator 708a and the first bookmark 702a displayed on the scroll bar 304. In addition, the virtual-reality editing system 108 skips to the first bookmarked location of the virtual-reality display 202.

In addition, or as an alternative to selecting the bookmarks 702a-c indicted on the scroll bar 304, the virtual-reality editing system 108 can provide bookmark navigation controls 706 including forward or backward inputs that skip to the next bookmark or previous bookmark. For example, as shown in FIGS. 7B and 7C, in response to the user 106 selecting the forward input of the bookmark navigation controls 706, the virtual-reality editing system 108 skips from the third bookmark 702c to the first bookmark 702a. Further, as shown in FIG. 7C, the virtual-reality editing system 108 displays the frame of the virtual-reality video corresponding to the first bookmark 702a. In one or more embodiments, the virtual-reality editing system 108 positions the virtual-reality display 202 so that the identified bookmark is positioned at the center of the display area of the virtual-reality display 202.

Figure 8A:
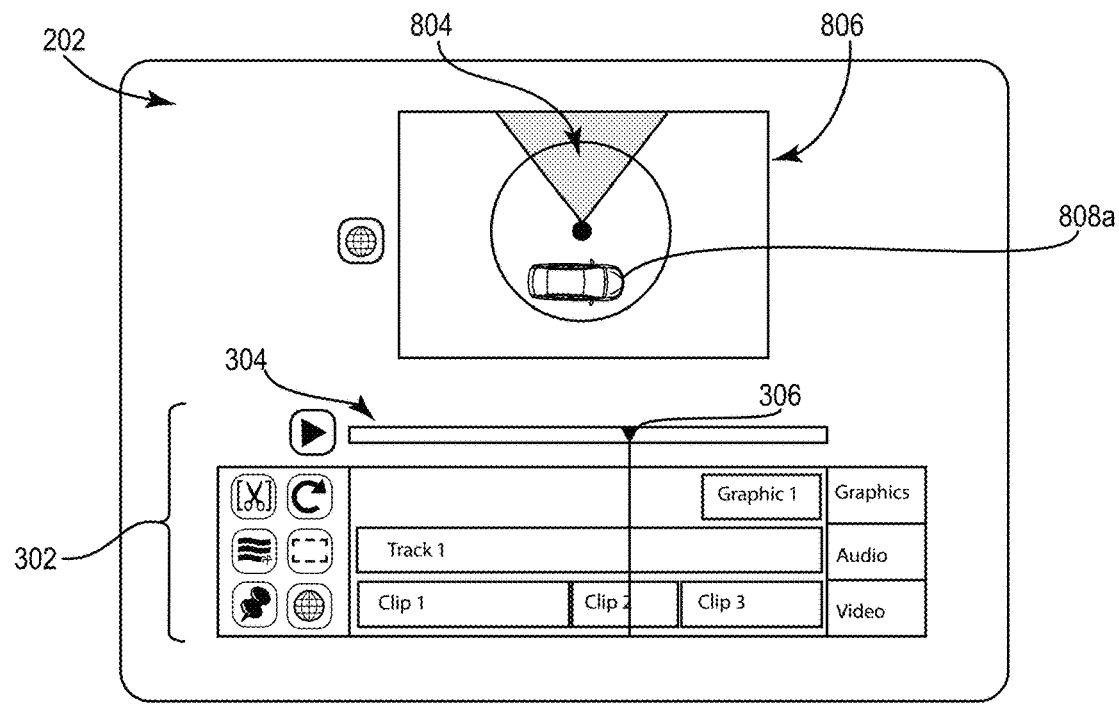
FIGS. 8A-8B illustrate an example interface for detecting an orientation of a field of view of virtual-reality content within a virtual-reality environment in accordance with one or more embodiments.

Moreover, in one or more embodiments, the virtual-reality editing system 108 provides top view controls that enable the user 106 to see a top-down 360-degree preview of the virtual-reality display 202. For example, in response to detecting a selection of the top-down control icon 310f, the virtual-reality editing system 108 provides a top-down preview 802 including a top-down 360-degree preview of the current frame of the virtual-reality display 202. As shown in FIG. 8A, the top-down preview 802 includes a graphic displayed over a portion of the virtual-reality display 202. It is appreciated that the user 106 can select and move the top-down preview 802 to any other portion of the displayed portion of the virtual-reality display 202.

As shown in FIG. 8A, the top-down preview 802 includes an indication of the perspective of the user 106 with respect to the virtual-reality display. For example, the top-down preview 802 includes a top-down display preview 804 showing a portion of the top-down preview 802 that corresponds to the currently displayed portion of the virtual-reality display 202. In addition, the top-down preview 802 includes a top-down peripheral preview 806 showing a portion of the top-down preview 802 that corresponds to the current peripheral portion of the virtual-reality display 202.

Figure 8B:
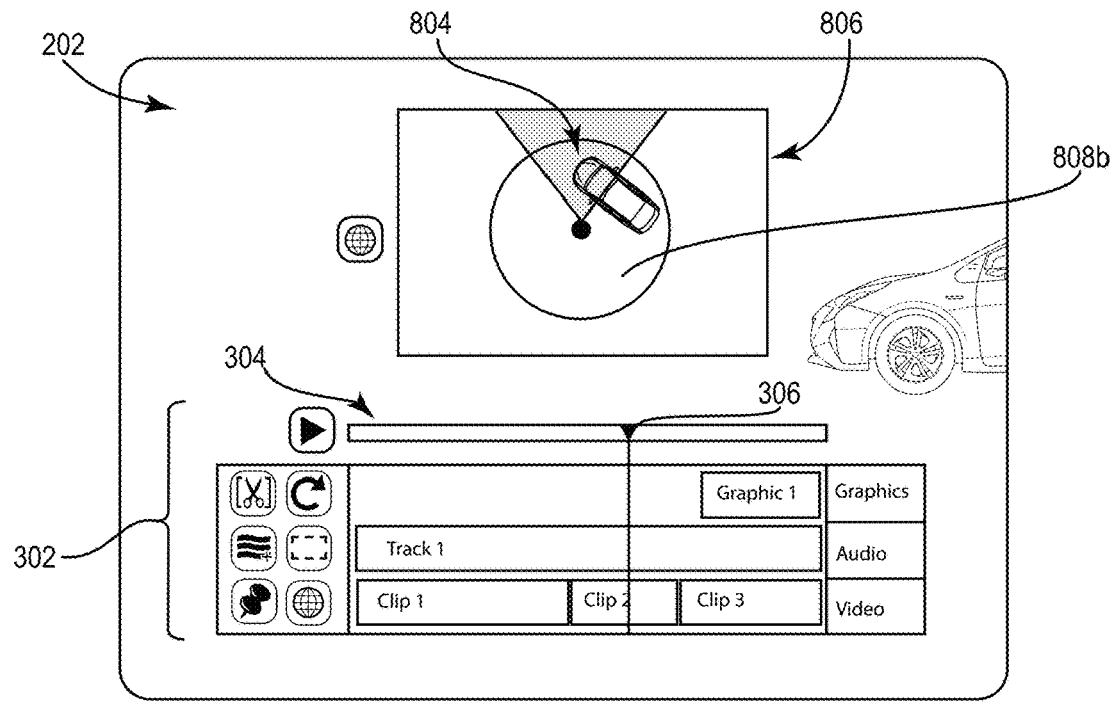

As shown in FIGS. 8A-8B, the virtual-reality editing system 108 provides a top-down preview 804 that illustrates what is happening within the virtual-reality display 202 both within the field of view of the user 106 and in the peripheral view of the user 106. For example, as shown in FIG. 8A, the top-down preview 802 includes a car at a first position 808a behind (e.g., within the peripheral display) the user 106 and outside the displayed portion of the virtual-reality display 202. As the video progresses from the video frame shown in FIG. 8A to the video frame shown in FIG. 8B, the top-down preview 802 shows the car moving from the first position 808a to a second position 808b passing from the peripheral portion of the virtual-reality display 202 to the displayed portion of the virtual-reality display 202.

In one or more embodiments, the top-down preview 802 changes based on scrolling through video frames of the virtual-reality video. For example, as shown in FIGS. 8A and 8B, the position icon 306 moves from a first position along the scroll bar 304 in FIG. 8A to a second position along the scroll bar 304 in FIG. 8B. In one or more embodiments, the top-down preview 802 changes based on movement of the virtual-reality device 104. For example, as the user 106 turns to view a different portion of the virtual-reality display 202, the top-down preview 802 can change to include different portions of the virtual-reality display 202 within the top-down display preview 804 and the top-down peripheral preview 806.

Figure 9:
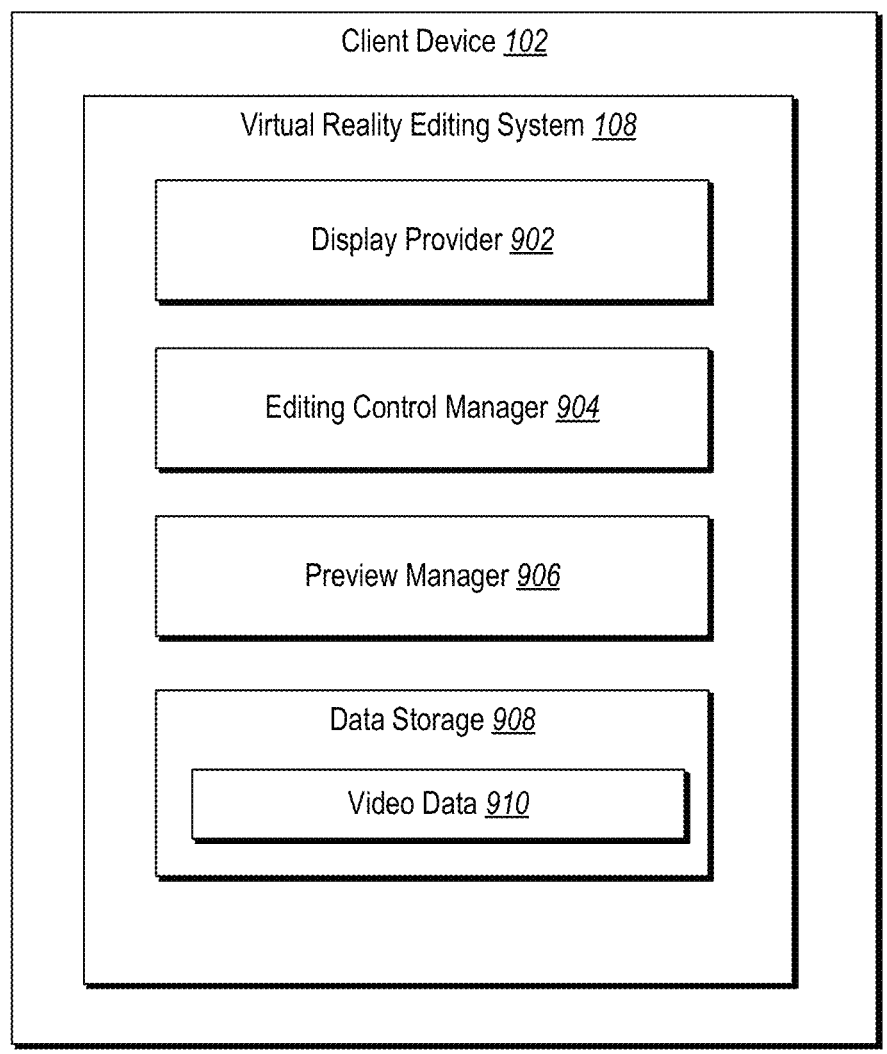
FIG. 9 illustrates a block diagram of an example computing device including a virtual-reality editing system implemented thereon in accordance with one or more embodiments.

Turning now to FIG. 9, additional detail will be provided regarding components and capabilities of an example architecture for a virtual-reality editing system 108 that may be implemented on a client device 102 in accordance with one or more embodiments. In particular, FIG. 9 illustrates an example embodiment of a client device 102 having a virtual-reality editing system 108 thereon that accomplishes features and functionality associated with one or more embodiments described above. For example, the virtual-reality editing system 108 enables a user 106 of a virtual-reality device 104 to view a display of a virtual-reality video as well as implement and preview edits to the virtual-reality video while wearing the virtual-reality device 104. As shown in FIG. 9, the virtual-reality editing system 108 includes a display provider 902, an editing control manager 904, a preview manager 906, and a data storage 908 including video data 910.

As illustrated in FIG. 9, the virtual-reality editing system 108 includes a display provider 902. In particular, the display provider 902 provides a virtual-reality display 202 of a virtual-reality video via a virtual-reality device 104. In one or more embodiments, providing the virtual-reality display 202 includes providing a displayed portion including a portion of the virtual-reality display 202 within an immediate field of view of the user 106 wearing the virtual-reality device 104. In addition, providing the virtual-reality display includes providing a peripheral portion including a portion of the virtual-reality display outside the immediate field of view of the user 106 wearing the virtual-reality device 104. As described in further detail above, the display provider 902 can dynamically modify the displayed portion and peripheral portion based on movement of the virtual-reality device 104.

As further shown in FIG. 9, the virtual-reality editing system 108 includes an editing control manager 904. In particular, the editing control manager 904 provides the editing control interface 302 over a portion of the virtual-reality display 202. In one or more embodiments, the editing control manager 904 provides the editing control interface 302 at a fixed location over the displayed portion of the virtual-reality display 202. In addition, the editing control manager 904 provides the editing control interface 302 including various controls to enable the user 104 to conveniently interact with the virtual-reality video to implement and preview edits to the virtual-reality video. Examples of controls include, for example, trim controls, rotational alignment controls, vignetting controls, graphic controls, bookmarking controls, and top-view controls.

As further shown in FIG. 9, the virtual-reality editing system 108 includes a preview manager 906. In particular, the preview manager 906 provides a real-time preview of one or more modifications made to the virtual-reality video via selection of various controls. For example, in response to detecting a user selection of a rotational control, the preview manager 906 provides a preview of adjacent video clips from different sections of a virtual-reality video. In addition, the preview manager 906 provides an interactive 360-degree visualization of each of the adjacent video clips that enable the user 106 to interact with the previews to align perspectives from the adjacent video clips thus preventing possible disorientation when viewing the virtual-reality video.

As another example, the preview manager 906 narrows a field of view of the virtual-reality display based on a scrolling action with respect to the editing interface 302. For example, in one or more embodiments, the preview manager 906 narrows a field of view by causing a background to appear over an outer portion of the virtual-reality video. In one or more embodiments, the preview manager 906 narrows the field of view based on a speed or rate (e.g., frames/second) of the scrolling action. In one or more embodiments, the preview manager 906 narrows the field of view based on detected movement of content within the virtual-reality display.

As further shown in FIG. 9, the virtual-reality editing system 108 includes a data storage 908 including video data 910. In one or more embodiments, the video data 910 includes any data associated with the virtual-reality video. For example, the video data 910 can include data associated with various layers of the virtual-reality video (e.g., video layer, audio layer, graphics layer). In addition, the video data 910 can include directional data including, for example, a true north for the virtual-reality video or discrete sections of the virtual-reality video. The video data 910 can further include time data, location data, or other metadata of the virtual-reality video. The video data 910 can further include detected objects or motion of the virtual-reality video. Moreover, in one or more embodiments, the video data 910 includes various edits or modifications made to the virtual-reality video.

Using one or more embodiments described herein, the virtual-reality editing system 108 provides an improved interactive experience to editors and producers of virtual-reality videos. For example, surveyed users universally found the editing interface 302 and controls easy to use and learn. In addition, surveyed users overwhelmingly indicated that the user controls for alignment rotation, narrowing the field of view, inserting/moving a graphic, displaying the top-down view, and adding/navigating bookmarks improved the virtual-reality experience over conventional systems for editing and previewing edits to virtual-reality videos.

Figure 11:
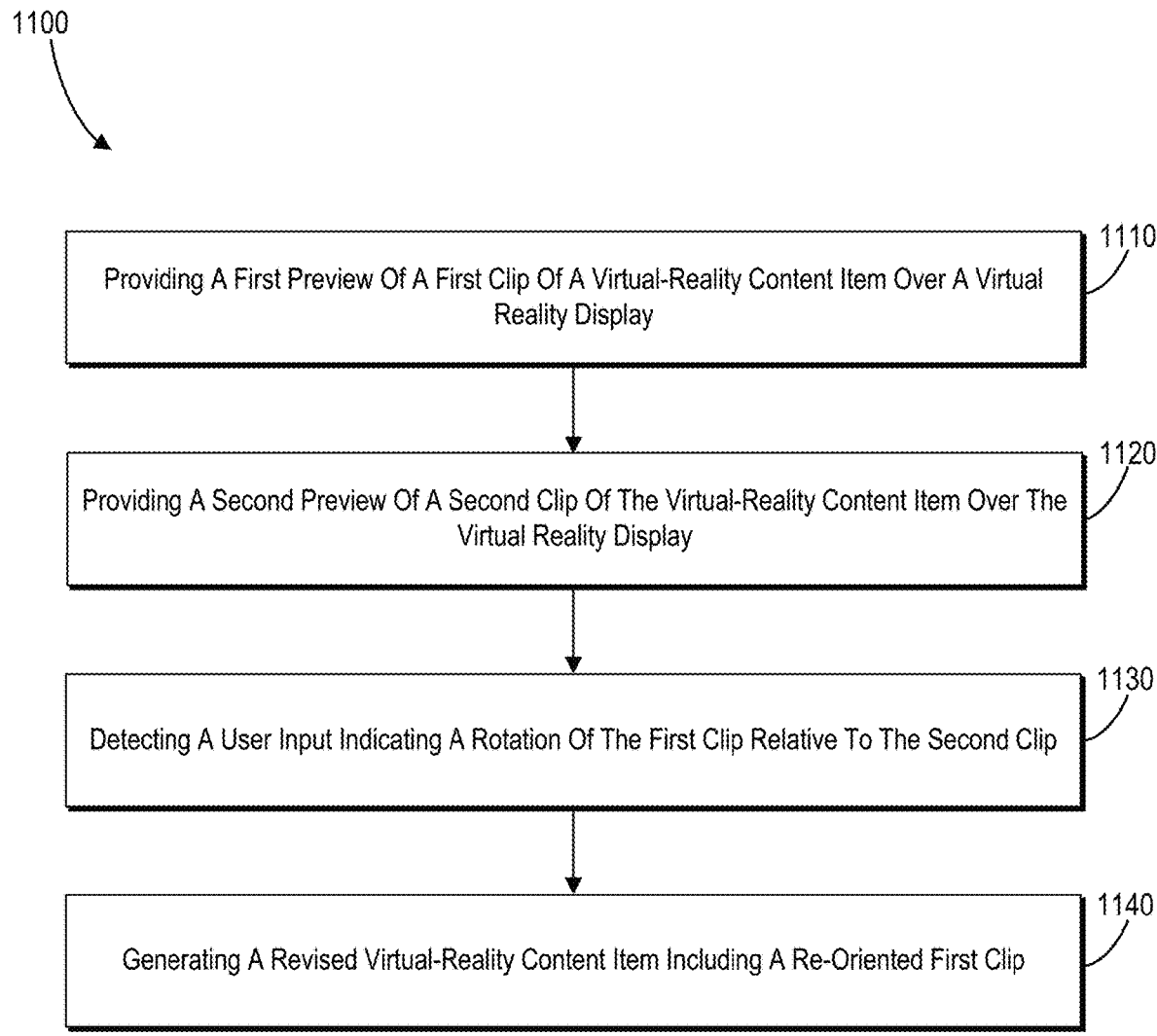
FIG. 11 illustrates a series of acts for performing a step for manipulating the display of a virtual-reality content item in response to a selection of a control in accordance with one or more embodiments.
Figure 12:
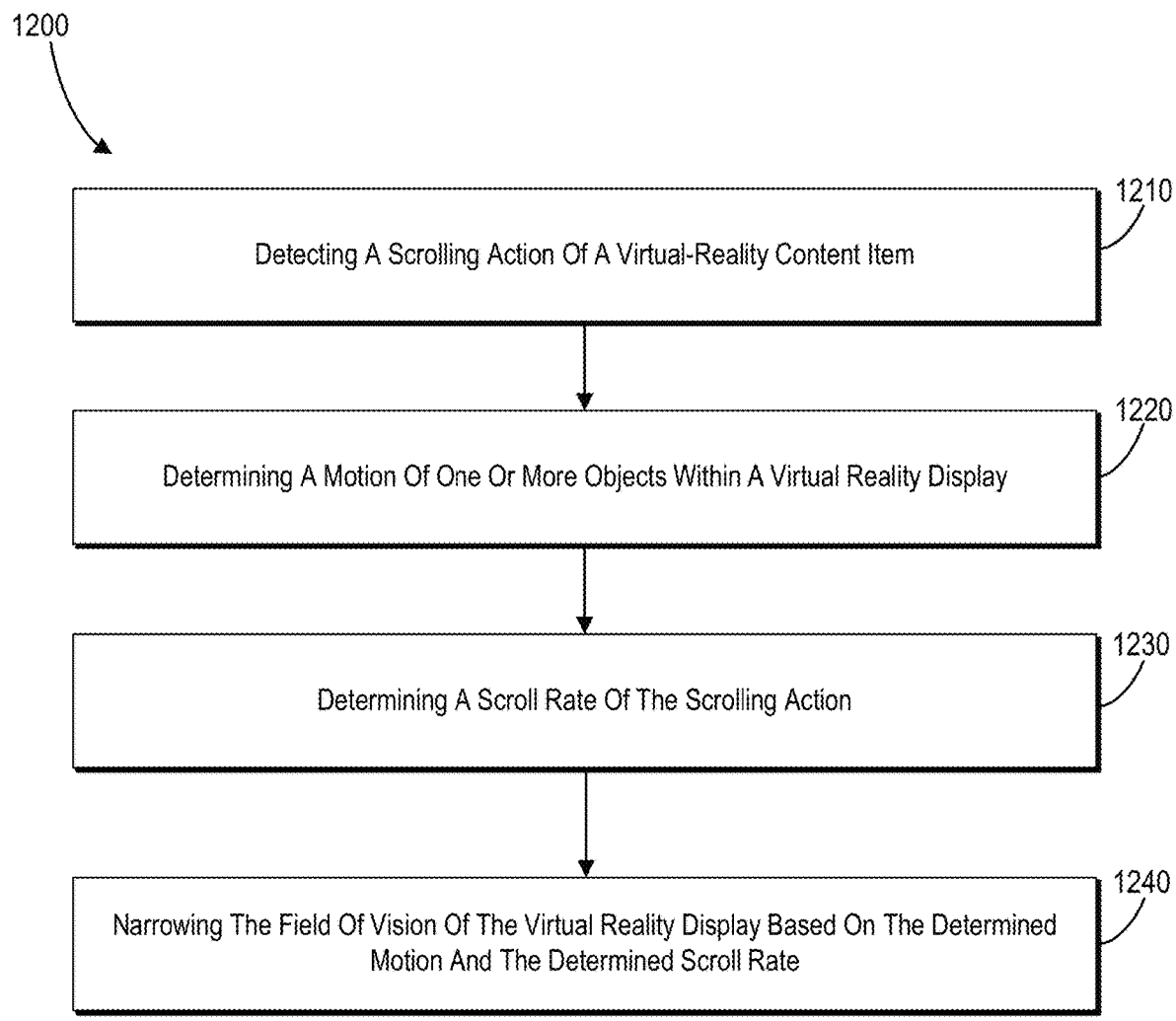
FIG. 12 illustrates another series of acts for performing a step for manipulating the display of a virtual-reality content item in response to a selection of a control in accordance with one or more embodiments.

FIGS. 1-9, the corresponding text, and the example, provide a number of different systems and devices that enable viewing of a virtual-reality content item in a virtual-reality environment, interaction with the virtual-reality content item, and editing of the virtual-reality content item all during display of the virtual-reality content item via a virtual-reality device. In addition to the foregoing, embodiments can also be described in terms of flowcharts comprising acts and steps in a method for accomplishing a particular result. For example, FIGS. 10-12 illustrate flowcharts of exemplary methods and acts in accordance with one or more embodiments.

Figure 10:
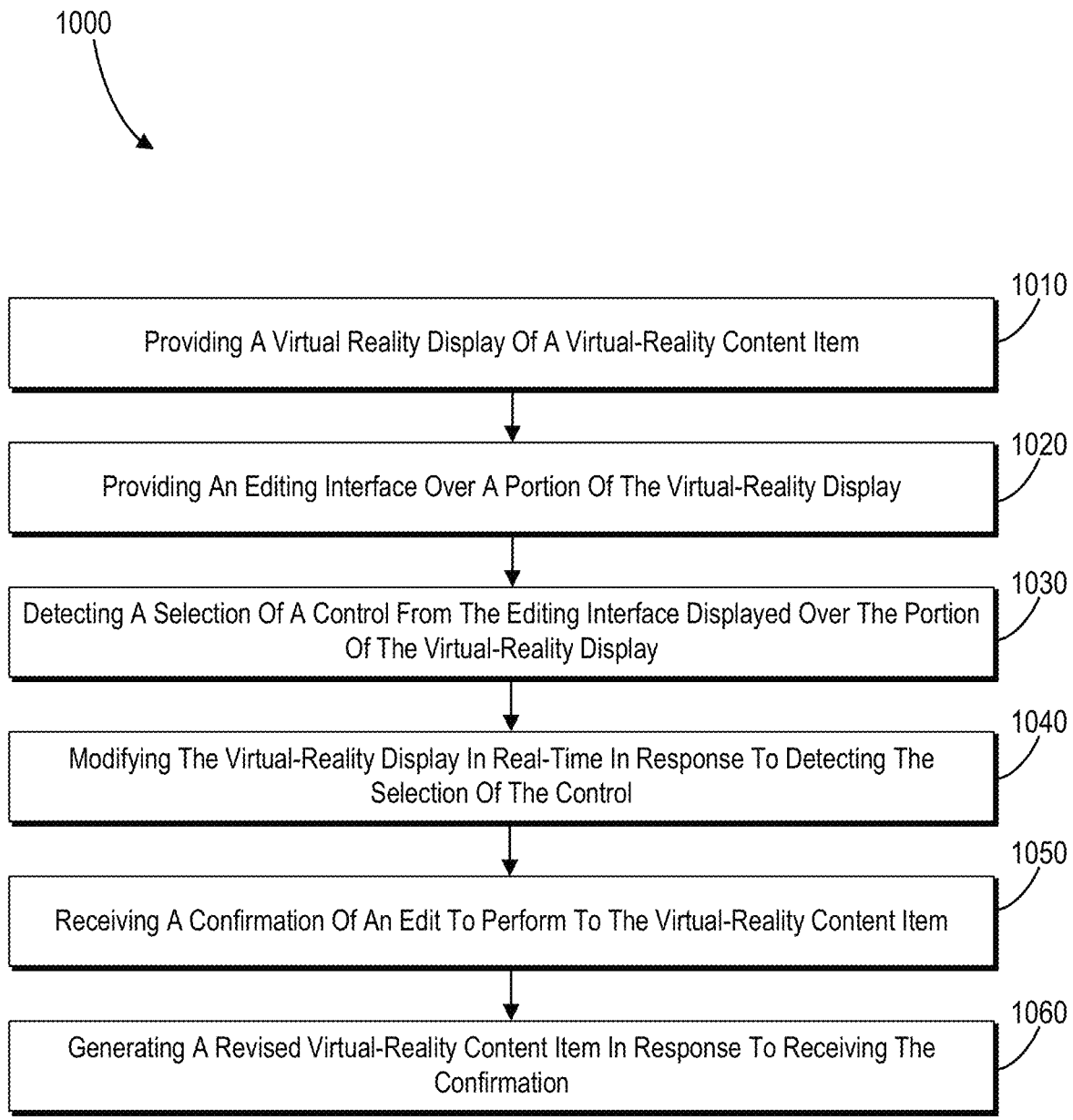
FIG. 10 illustrates a flowchart of a series of acts in a method for implementing and previewing edits to virtual-reality content in accordance with one or more embodiments.

FIG. 10 illustrates a flowchart of one example method 1000 for facilitating editing of virtual-reality content in a virtual-reality environment in accordance with one or more embodiments. For example, the method 1000 includes an act 1010 of providing a virtual-reality display 202 of a virtual-reality content item. In particular, in one or more embodiments, the act 1010 involves providing a virtual-reality display 202 of a virtual-reality content item via a virtual-reality device 104. As mentioned above, in one or more embodiments, the virtual-reality content item includes a virtual-reality video viewable via the virtual-reality device 104.

In one or more embodiments, providing the virtual-reality display 202 of the virtual-reality content item includes providing a displayed portion and a peripheral portion of the virtual-reality display 202. In particular, in one or more embodiments, providing the virtual-reality display 202 includes providing a displayed portion within a field of view of the virtual-reality device 104. In addition, in one or more embodiments, providing the virtual-reality display 202 includes providing a peripheral portion outside the field of view of the virtual-reality device 104. In one or more embodiments, the peripheral portion is viewable via movement of the virtual-reality device 104. For example, in one or more embodiments, some or all of the displayed portion may be replaced by the peripheral portion based on movement (e.g., horizontal rotation) of the virtual-reality device 104.

As further shown in FIG. 10, the method 1000 includes an act 1020 of providing an editing interface 302 over a portion of the virtual-reality display 202. In particular, in one or more embodiments, the act 1020 includes providing an editing interface 302 comprising a plurality of controls for implementing and previewing edits to the virtual-reality content item. The act 1020 further includes providing the editing interface 302 including the controls over a portion (e.g., the displayed portion) of the virtual-reality display 202 of the virtual-reality content item.

In one or more embodiments, providing the editing interface 302 includes providing the editing interface 302 within a field of view of the virtual-reality device 104 irrespective of movement or an orientation of the virtual-reality device 104. In particular, in one or more embodiments, providing the editing interface 302 includes modifying the portion of the virtual-reality content item in the field of view of the virtual-reality device 104 without modifying a position of the editing interface 302 within the field of view of the virtual-reality device 104.

As further shown in FIG. 10, the method 1000 includes an act 1030 of detecting a selection of a control from the editing interface 302 displayed over the portion of the virtual-reality display 202. For example, detecting the selection can include detecting a user selection of a control for editing or otherwise altering an appearance of the virtual-reality display 202. Alternatively, detecting the selection can include detecting other user interactions with respect to the virtual-reality display 202. For example, detecting the selection can include detecting a navigation input or a playback of the virtual-reality content item.

As further shown in FIG. 10, the method 1000 includes an act 1040 of modifying the virtual-reality display 202 in real-time in response to detecting the selection of the control. Modifying the virtual-reality display 202 may include providing an alternate preview of one or more frames of the virtual-reality content item. Modifying the virtual-reality display 202 can further include providing one or more indications of edits to the virtual-reality content item within the virtual-reality display 202. In addition, modifying the virtual-reality display 202 can include providing further controls to enable the user to preview edits or modifications to both the display portion and peripheral portion of the virtual-reality display.

As further shown in FIG. 10, the method 1000 includes an act 1050 of receiving a confirmation of an edit to perform to the virtual-reality content item. For example, in one or more embodiments, receiving a confirmation includes receiving one or more user inputs via the virtual-reality device 104 or other input device (e.g., keyboard, mouse) to confirm an edit to apply to the virtual-reality content item. In addition, in one or more embodiments, the method 1000 includes an act 1060 of generating a revised virtual-reality content item in response to receiving the confirmation. In one or more embodiments, the method 1000 further includes providing a preview of the revised virtual-reality content item via the virtual-reality device 104.

As mentioned above, the method 1000 can include detecting a selection of a variety of different controls. In one or more embodiments, detecting the selection of the control includes detecting a selection of an alignment control to align a last frame of a first video clip with a first frame of a second video clip at a transition from the first video clip to the second video clip. In response to the selection of the alignment control, the method 1000 includes modifying the virtual-reality display by providing a first preview of the first video clip and a second preview of the second video clip within the field of view of the virtual-reality device. The method 1000 can also involve providing an indication of an orientation of the last frame and an orientation of the first frame at the transition. In one or more embodiments, the first preview includes a preview of a video frame of a first clip and a video frame of a second clip. In one or more embodiments, the first and second clips refer to adjacent video clips that appear consecutively upon playback of the virtual-reality content item.

In one or more embodiments, the method 1000 comprises receiving user input with respect to the first preview indicating a rotation of the first video clip relative to the second video clip. For example, receiving the user input may include detecting a selection of the first clip and dragging the first clip to align content from the first clip with content of the second clip. Alternatively, in one or more embodiments, receiving the user input includes detecting a horizontal rotation of the virtual-reality device 104 while the first preview is selected indicating a rotation of the first clip relative to the second clip. In one or more embodiments, the method 1000 includes detecting and processing a similar selection and rotation of the second clip relative to the first clip.

In response to detecting the selection and rotation of the first clip relative to the second clip, the method 1000 includes generating the revised virtual-reality content item. In particular, generating the revised virtual-reality content item includes reorienting a true north of the first clip relative to the second clip so as to change the orientation of the last frame for the first video clip at the transition. In particular, the method 1000 includes normalizing, rotating, or otherwise changing the default orientation of the first video clip to be different from the second video clip. In one or more embodiments, the method 1000 includes rotating only one of the first clip or second clip. Alternatively, in one or more embodiments, the method 1000 includes rotating both the first clip and second clip.

As another example, in one or more embodiments, detecting a selection of a control includes detecting a scrolling action. In response, the method 1000 includes modifying the virtual-reality display 202 of the virtual-reality content item by narrowing a field of view of the virtual-reality display 202. In one or more embodiments, narrowing the field of view includes narrowing the field of view based on a scrolling speed (e.g., frames/second) of the detected scrolling action. Alternatively, in one or more embodiments, narrowing the field of view includes narrowing the field of view based on detected movement of one or more objects within the virtual-reality display 202.

Further, in one or more embodiments, narrowing the field of view includes displaying a background that obstructs an outer portion of the virtual-reality display 202. For example, narrowing the field of view can include displaying a black or other uniform color of background that obstructs the outer boundary of the displayed portion of the virtual-reality display 202. Narrowing the field of view can further include displaying other types of backgrounds. For example, in one or more embodiments, narrowing the field of view includes displaying a virtual environment including a room, a park, the sky, a pattern, or other background design that simulates an ambient environment of the user 106 of the virtual-reality device 104.

As another example, in one or more embodiments, detecting the selection of the control from the plurality of controls involves detecting an addition of a graphic to the virtual-reality display 202. For example, in one or more embodiments, detecting the selection includes receiving a user input to display a graphic over the top of a portion of the virtual-reality display 202 (e.g., at a location within the virtual-reality display 202). In addition, in one or more embodiments, the method includes modifying the virtual-reality display 202 of the 360-degree audio-visual content by displaying the graphic over a portion of the virtual-reality display.

In one or more embodiments, the method 1000 includes one or more steps for manipulating the virtual-reality display 202 in accordance with a selection of a control. For example, in one or more embodiments, the method 1000 includes a step for manipulating a display of the virtual-reality content item in response to the selection of the control. FIGS. 11-12 show example methods including acts for manipulating the virtual-reality display 202 of the virtual-reality content item in response to a selection of a control.

For example, FIG. 11 illustrates a series of acts 1100 in one embodiment of performing a step for manipulating the display of the virtual-reality content item in response to selection of a control of an editing interface over a portion of a virtual-reality display of a virtual-reality content item. The acts can include an act 1110 of providing a first preview of a first clip of a virtual-reality content item over a virtual-reality display 202. In particular, in one or more embodiments, the act 1110 includes providing a first preview of a first clip of the virtual-reality content item over a displayed portion of the virtual-reality display 202. In addition, as shown in FIG. 11, the series of acts 1100 includes an act 1120 of providing a second preview of a second clip of the virtual-reality content item over the virtual-reality display 202 (e.g., over the displayed portion of the virtual-reality display 202).

As further shown in FIG. 11, the series of acts 1100 includes an act 1130 of detecting a user input indicating a rotation of the first clip relative to the second clip. For example, in one or more embodiments, the act 1130 includes detecting a user input with respect to the first preview of the first clip indicating a rotation of the first clip relative to the second clip. As further shown in FIG. 11, the series of acts 1100 includes an act 1140 of generating a revised virtual-reality content item including a re-oriented first clip. For example, in one or more embodiments, the act 1140 includes generating a revised virtual-reality content item comprising a reoriented portion of the virtual-reality content item corresponding to the first clip.

As another example, FIG. 12 illustrates another series of acts 1200 in one embodiment of performing a step for manipulating the display of the virtual-reality content item in response to selection of a control of an editing interface over a portion of a virtual-reality display of a virtual-reality content item. For example, in one or more embodiments, the series of acts 1200 includes an act 1210 of detecting the scrolling action of a virtual-reality content item. In particular, act 1210 can include detecting a scrolling action that exceeds a threshold rate (e.g., frames/second) of scrolling through the virtual-reality content item. As further shown in FIG. 12, the series of acts 1200 includes an act 1220 of determining a motion of one or more objects within a virtual-reality display 202. In addition, as shown in FIG. 12, the series of acts 1200 includes an act 1230 of determining a scroll rate (e.g., frames/second) of the scrolling action. Moreover, in one or more embodiments, the series of acts 1200 includes an act 1240 of narrowing a field of view of the virtual-reality display 202 based on the determined motion and the determined scroll rate. For example, in one or more embodiments, the act 1240 includes narrowing a field of view of the virtual-reality display 202 of the virtual-reality content item based on the determined motion of one or more objects and the determined scroll rate of the scrolling action.

Determining the motion and scroll rate and rate of the scrolling action may be performed in various ways. For example, in one or more embodiments, determining the motion of one or more objects includes computing a motion magnitude of the virtual-reality display 202 of the virtual-reality content item using the following expression:

$$M_f = \sum_{i=1}^{N} \|V_i\|$$

where N is the number of tracked points in the user's current view and $V_i$ is the motion vector from a current frame (f) to the next frame (f+1) of point i. Moreover, in one or more embodiments, determining the scroll rate includes determining a number of frames/second that the scrolling action causes the virtual-reality display 202 to display as a user 106 moves a position icon 306 along a scroll bar 304 of the edit control interface 302.

Upon determining the motion of one or more objects and the scroll rate of the scrolling action, the method 1200 can further determine a rate of contraction for narrowing the field of view. In one or more embodiments, determining the rate of contraction includes setting a default rate of contraction (e.g., a range of contraction rates) between 0 and −30 degrees/second and contracting the field of view based on the determined motion magnitude ($M_f$). In addition, determining the rate of contraction further includes multiplying the rate of contraction by the scrolling rate (e.g., number of frames/second) of the scrolling action.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 13:
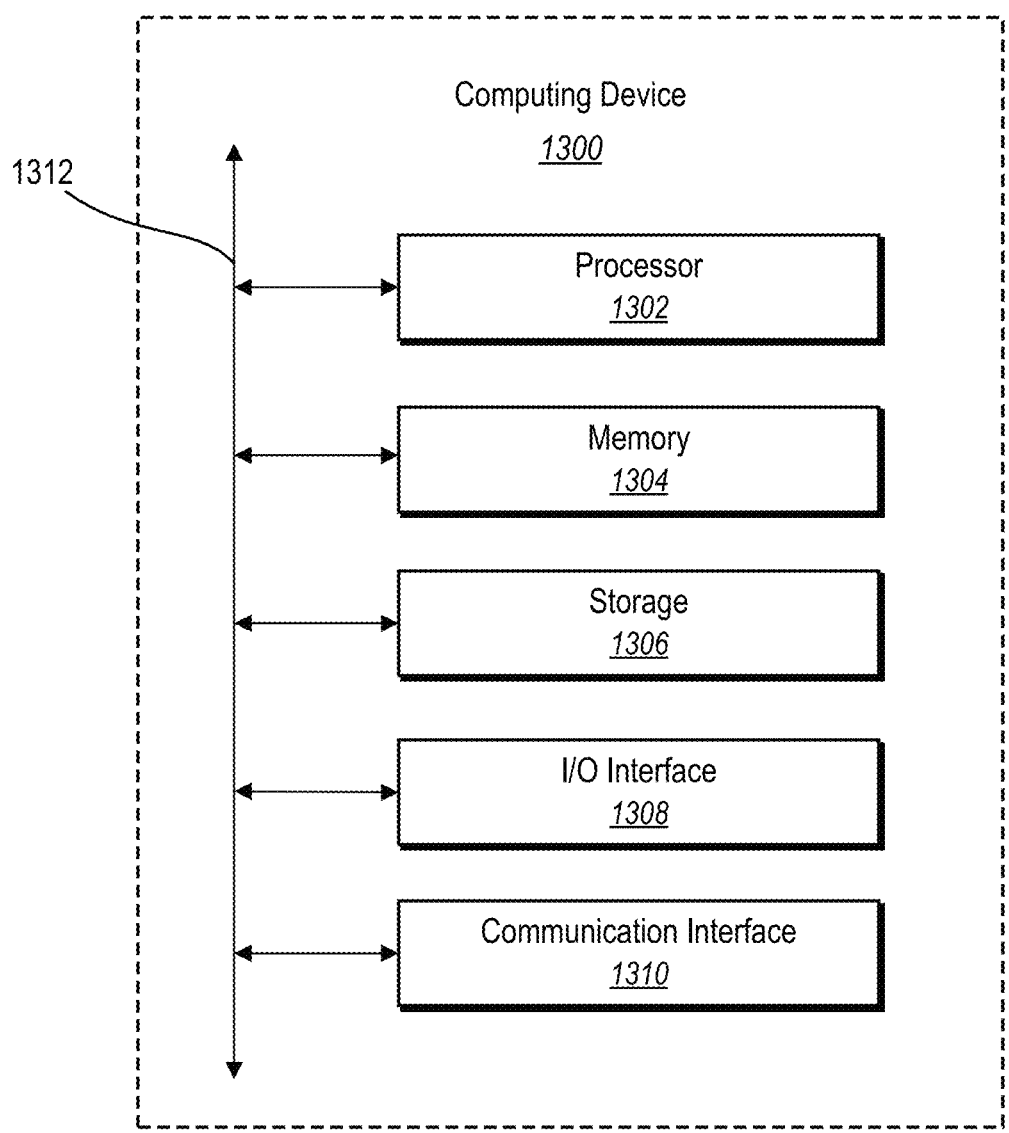
FIG. 13 illustrates a block diagram of an example computing device in accordance with one or more embodiments.

FIG. 13 illustrates a block diagram of exemplary computing device 1300 that may be configured to perform one or more of the processes described above. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example and not by way of limitation, to execute instructions for digitizing real-world objects, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions related to object digitizing processes (e.g., digital scans, digital models).

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method for facilitating editing of audio visual content in a virtual-reality environment, the computer-implemented method comprising:
providing a display of a spherical panorama video via a virtual-reality device, the spherical panorama video comprising greater than 180 degrees of a horizontal field of view;
providing an interactive editing interface via the virtual-reality device over a portion of the display of the spherical panorama video, the interactive editing interface comprising:
a plurality of controls for implementing and previewing edits to the spherical panorama video, and
a video layer timeline displaying an order of a plurality of spherical panorama video clips forming the spherical panorama video;
detecting, via the virtual-reality device, a user interaction with the interactive editing interface provided over the portion of the display of the spherical panorama video displayed by the virtual-reality device;
performing a modification, in real-time in response to the user interaction with the interactive editing interface, to the spherical panorama video by shifting the order of at least one of the plurality of spherical panorama video clips, inserting an additional spherical panorama video clip, removing a spherical panorama video clip from the spherical panorama video, trimming a spherical panorama video clip, or rotationally aligning a default orientation of a spherical panorama video clip; and
providing a preview of the spherical panorama video with the modification via the virtual-reality device.

2. The computer-implemented method of claim 1, wherein providing the display of the spherical panorama video comprises displaying a portion of the spherical panorama video aligned to a field of view and not displaying a peripheral portion of the spherical panorama video.

3. The computer-implemented method of claim 2, further comprising:
modifying the display of the spherical panorama video to include a view of the portion of the spherical panorama video aligned to the field of view and the peripheral portion of the spherical panorama video; and
providing a visual indication of one or more of the portion of the spherical panorama video aligned to the field of view or the peripheral portion of the spherical panorama video.

4. The computer-implemented method of claim 3, wherein providing the visual indication of one or more of the portion of the spherical panorama video aligned to the field of view of the virtual-reality device or the peripheral portion of the spherical panorama video comprises applying a color filter to one or more of the portion of the spherical panorama video aligned to the field of view of the virtual-reality device or the peripheral portion.

5. The computer-implemented method of claim 3, wherein performing the modification, in real-time in response to the user interaction with the video layer timeline, to the spherical panorama video comprises horizontally rotating the spherical panorama video to realign the spherical panorama video relative to the field of view so that a portion of the spherical panorama video is re-aligned relative to the field of view comprises at least a section of the peripheral portion of the spherical panorama video.

6. The computer-implemented method of claim 5, wherein:
the virtual-reality device is a headset;
detecting the user interaction with the interactive editing interface comprises detecting selection of a spherical panorama video clip; and
rotating the spherical panorama video is in response to movement of the headset.

7. The computer-implemented method of claim 1, wherein:
detecting the user interaction with the interactive editing interface comprises detecting a dragging of a front or back handle of a spherical panorama video clip within the video layer timeline; and
performing the modification, in real-time in response to the user interaction with the interactive editing interface, to the spherical panorama video comprises trimming the spherical panorama video clip based on movement of the front or back handle.

8. The computer-implemented method of claim 1, further comprising:
receiving a confirmation of the modification after providing the preview; and
generating a revised spherical panorama video including the modification.

9. The computer-implemented method of claim 1, wherein:
further comprising detecting a scrolling action; and
narrowing a field of view of the display based on a scrolling speed of the detected scrolling action.

10. The computer-implemented method of claim 1, wherein:
detecting the user interaction with the interactive editing interface comprises detecting a selection and movement of a spherical panorama video clip within the video layer timeline; and
performing the modification, in real-time in response to the user interaction with the interactive editing interface, to the spherical panorama video comprises shifting the order of the at least one of the plurality of spherical panorama video clips based on the movement.

11. A system comprising:
memory comprising a virtual-reality content item;
a virtual-reality headset device; and
a computing device configured to cause the system to:
provide a display of a spherical panorama video via the virtual-reality headset device, the spherical panorama video comprising greater than 180 degrees of a horizontal field of view;
provide an interactive editing interface via the virtual-reality headset device over a portion of the display of the spherical panorama video, the interactive editing interface comprising:
a plurality of controls for implementing and previewing edits to the spherical panorama video, and
a video layer timeline displaying an order of a plurality of spherical panorama video clips forming the spherical panorama video;
detect, via the virtual-reality headset device, a user interaction with the interactive editing interface provided over the portion of the display of the spherical panorama video displayed by the virtual-reality headset device;
perform a modification to, in real-time in response to the user interaction with the interactive editing interface, the spherical panorama video by shifting the order of at least one of the plurality of spherical panorama video clips, inserting an additional spherical panorama video clip, removing a spherical panorama video clip from the spherical panorama video, trimming a spherical panorama video clip, or rotationally aligning a default orientation of a spherical panorama video clip; and provide a preview of the spherical panorama video with the modification via the virtual-reality headset device.

12. The system of claim 11, wherein the computing device is configured to cause the system to cause the system to perform the modification to the spherical panorama video by:

provide a frame of a first spherical panorama video clip positioned above a frame of a second spherical panorama video clip;

visually indicate an orientation of the frame of the first spherical panorama video clip, the orientation of the frame of the first spherical panorama video clip dictating a field of view of the first spherical panorama video clip to be shown by default when viewing the first spherical panorama video clip;

visually indicate an orientation of the frame of the second spherical panorama video clip, the orientation of the frame of the second spherical panorama video clip dictating a field of view of the second spherical panorama video clip to be shown by default when viewing the second spherical panorama video clip; and rotate, in response the user interaction, the orientation of one or more of the frame of the first spherical panorama video clip or the frame of the second spherical panorama video clip.

13. The system of claim 12, wherein the computing device is configured to cause the system to:

detect the user interaction with the interactive editing interface by detecting selection of one of the first or second spherical panorama video clip; and rotate the selected first or second spherical panorama video clip in response to movement of the virtual-reality headset device.

14. The system of claim 11, wherein the computing device is configured to cause the system to:

determine a motion of one or more objects within the spherical panorama video;

determine a scroll rate of a scrolling action; and modify the display of the spherical panorama video by narrowing a field of view of the display of the spherical panorama video based on one or more of the determined motion of the one or more objects or the determined scroll rate of the scrolling action.

15. The system of claim 11, wherein the computing device is configured to cause the system to provide a graphic layer timeline in the interactive editing interface, the graphic layer timeline indicating a time and a duration during the spherical panorama video at which one or more graphics are displayed.

16. The system of claim 15, wherein the computing device is configured to cause the system to:

insert a graphic, comprising text or an image, as an overlay to the spherical panorama video; and provide a graphic icon in the graphic layer timeline representing a time and a duration during the spherical panorama video when the graphic is provided.

17. The system of claim 11, wherein the computing device is configured to cause the system to:

provide a plurality of bookmarks along a scroll bar of the interactive editing interface; and navigate to a time and position within the spherical panorama video associated with a first bookmark upon selection of the first bookmark.

18. A non-transitory computer-readable medium storing instructions that, when executed by at least one processor, cause a virtual-reality device to:

provide a display of a spherical panorama video, the spherical panorama video comprising greater than 180 degrees of a horizontal field of view;

provide an interactive editing interface via the virtual-reality device over a portion of the display of the spherical panorama video, the interactive editing interface comprising:

a plurality of controls for implementing and previewing edits to the spherical panorama video, and a video layer timeline displaying an order of a plurality of spherical panorama video clips forming the spherical panorama video;

detect, via the virtual-reality device, a user interaction with the interactive editing interface provided over the portion of the display of the spherical panorama video displayed by the virtual-reality device;

perform a modification, in real-time in response to the user interaction with the interactive editing interface, to the spherical panorama video by shifting an order of at least one of the plurality of spherical panorama video clips, inserting an additional spherical panorama video clip, removing a spherical panorama video clip from the spherical panorama video, trimming a spherical panorama video clip, or rotationally aligning a default orientation of a spherical panorama video clip; and provide a preview of the spherical panorama video with the modification via the virtual-reality device.

19. The non-transitory computer-readable medium of claim 18, further comprising instructions that, when executed by the at least one processor, cause the virtual-reality device to:

detect the user interaction with the interactive editing interface by detecting a dragging of a front or back handle of a spherical panorama video clip within the video layer timeline; and perform the modification, in real-time in response to the user interaction with the interactive editing interface, to the spherical panorama video by trimming the spherical panorama video clip based on movement of the front or back handle.

20. The non-transitory computer-readable medium of claim 18, further comprising instructions that, when executed by the at least one processor, cause the virtual-reality device to:

detect the user interaction with the interactive editing interface by detecting a selection of a spherical panorama video clip; and modify a default orientation of the selected spherical panorama video clip in response to movement of the virtual-reality device.

* * * * *